(12) United States Patent
Toshikuni et al.

(10) Patent No.: US 12,210,557 B2
(45) Date of Patent: Jan. 28, 2025

(54) DATA EXTRACTION SYSTEM AND DATA EXTRACTION METHOD

(71) Applicant: Hitachi, Ltd., Tokyo (JP)

(72) Inventors: Ai Toshikuni, Tokyo (JP); Tadahisa Kato, Tokyo (JP); Yasunari Takai, Tokyo (JP); Yasuto Nishiwaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/289,904

(22) PCT Filed: Feb. 22, 2022

(86) PCT No.: PCT/JP2022/007310
§ 371 (c)(1),
(2) Date: Nov. 8, 2023

(87) PCT Pub. No.: WO2022/254822
PCT Pub. Date: Dec. 8, 2022

(65) Prior Publication Data
US 2024/0273130 A1  Aug. 15, 2024

(30) Foreign Application Priority Data
May 31, 2021 (JP) .................................. 2021-091969

(51) Int. Cl.
*G06F 16/383* (2019.01)
*G06F 16/35* (2019.01)

(52) U.S. Cl.
CPC ............ *G06F 16/383* (2019.01); *G06F 16/35* (2019.01)

(58) Field of Classification Search
CPC .............................. G06F 16/183; G06F 16/75
See application file for complete search history.

(56) References Cited

U.S. PATENT DOCUMENTS

| 5,733,740 A | * | 3/1998 | Cover | .................... C12Q 1/689 435/320.1 |
| 2013/0185291 A1 | * | 7/2013 | Tyndall | ............... G06F 16/9535 707/723 |
| 2017/0085933 A1 | * | 3/2017 | Czeck, Jr. | ............ H04N 21/812 |

FOREIGN PATENT DOCUMENTS

| JP | 2004-21445 A | 1/2004 |
| JP | 2016-99868 A | 5/2016 |

OTHER PUBLICATIONS

Yuki Ebana, et al., "Extraction of minority opinions on topics in social media", Proceedings of the 2018 IEICE general conference.
(Continued)

*Primary Examiner* — Baoquoc N To
(74) *Attorney, Agent, or Firm* — MATTINGLY & MALUR, PC

(57) ABSTRACT

An input of a data group is received in which tag ID-appended data and time information on time the tag ID-appended data was created are associated; the number of instances is counted of the tag ID-appended data, to which a tag identified by a tag ID has been appended, occurring in each time slice for each tag ID included in the tag ID-appended data and for each time slice obtained by dividing a timeline by a predetermined duration, and the tags are extracted as a few exuberant and useful minority tags in a case where the counted number of instances is greater than a predetermined instance number threshold value and where a ratio of the time slices in which the number of instances does not satisfy a predetermined criterion is greater than a predetermined ratio threshold value; and data in which a score satisfies a predetermined criterion is determined.

8 Claims, 22 Drawing Sheets

(56) References Cited

OTHER PUBLICATIONS

Kyoko Ariyasu, et al., "SNS message analysis for regional prevention at a large-scale disaster", ITE Winer Annual Convention, 2014.
International Search Report of PCT/JP2022/007310 dated May 10, 2022.

* cited by examiner

FIG. 3

| TEXT | TIME INFORMATION | TAG ID |
|---|---|---|
| TEXT 1 | 2020/07/23 17:58:36 | TAG ID001, TAG ID002 |
| TEXT 2 | 2020/07/23 17:58:49 | TAG ID003 |
| TEXT 3 | 2020/07/23 17:59:14 | TAG ID001, TAG ID004 |
| TEXT 4 | 2020/07/23 18:01:22 | TAG ID001, TAG ID005 |
| ... | ... | ... |

FIG. 6

| TAG ID |
|---|
| TAG ID001 |
| TAG ID033 |
| TAG ID091 |
| ... |

FIG. 7

| TIME SLICE | NUMBER OF INSTANCES |
|---|---|
| 2020/07/23 16:00:00 TO 16:59:59 | 0 |
| 2020/07/23 17:00:00 TO 17:59:59 | 34 |
| 2020/07/23 18:00:00 TO 18:59:59 | 8 |
| ... | ... |

FIG. 9

| TAG ID | PEAK TIME SLICE | TEXT | TIME INFORMATION |
|---|---|---|---|
| TAG ID001 | 2020/7/23 17:00:00 | TEXT 1 | 2020/7/23 17:58:36 |
| ... | ... | ... | ... |

FIG. 10

| TEXT | TIME INFORMATION | USED WORDS |
|---|---|---|
| TEXT 1 | 2020/7/23 17:58:36 | WORD 1, WORD 2 |
| TEXT 3 | 2020/7/23 17:59:14 | WORD 2, WORD 4 |
| TEXT 4 | 2020/7/23 18:01:22 | WORD 3 |
| ... | ... | |

FIG. 11

| WORD | APPEARANCE RATE |
|---|---|
| WORD 1 | 0.8 |
| WORD 2 | 0.4 |
| WORD 3 | 0.2 |
| WORD 4 | 0.2 |
| ... | ... |

FIG. 12

| TIME SLICE |
|---|
| 2020/7/23 17:00:00 TO 17:59:59 |
| ... |

FIG. 15

| WORD | SCORE |
|---|---|
| WORD 1 | 0.1 |
| WORD 2 | 0.4 |
| WORD 3 | −0.2 |
| WORD 4 | −0.1 |
| ... | ... |

1601 TEXT SCORE RECORD, 1602, 1603, 1604, 160

| TEXT | TIME INFORMATION | SCORE |
|---|---|---|
| TEXT 1 | 2020/7/23 17:58:36 | 0.5 |
| TEXT 3 | 2020/7/23 17:59:14 | 0.3 |
| ... | ... | |

| TEXT | TIME INFORMATION |
|---|---|
| TEXT 1 | 2020/7/23 17:58:36 |
| TEXT 2 | 2020/7/23 17:58:49 |
| TEXT 3 | 2020/7/23 17:59:14 |
| TEXT 4 | 2020/7/23 18:01:22 |
| ... | ... |

FIG. 27

| TAG ID | TAG ID001 | TAG ID033 | TAG ID091 | ... |
|---|---|---|---|---|
| TAG ID001 | 1.00 | 0.36 | 0.77 | ... |
| TAG ID033 | 0.36 | 1.00 | 0.12 | ... |
| TAG ID091 | 0.77 | 0.12 | 1.00 | ... |
| ... | ... | ... | ... | ... |

FIG. 28

| TAG ID | SCORE |
|---|---|
| TAG ID001 | 0.071 |
| TAG ID033 | 0.150 |
| TAG ID091 | 0.143 |
| ... | ... |

DATA EXTRACTION SYSTEM AND DATA EXTRACTION METHOD

TECHNICAL FIELD

The present invention relates to a data extraction system and a data extraction method.

BACKGROUND ART

Communication using social media such as blogs and social networking services has become widespread, and a large amount of text data has been accumulated. Furthermore, the accumulation of text data using intranets or the like has progressed also in individual organizations such as companies. In recent years, there has been an increasing need to analyze such a large amount of accumulated text data to discover new value and utilize the value in corporate activities. At the same time, there is an expectation to acquire desired text data efficiently from a large amount of text data.

As one method for acquiring desired text data from a large amount of text data, it is common to use a search technique such as a full text search. Using such a search method, a search is usually executed by designating a keyword representing a feature of the desired text data. However, because the keyword search results in a huge amount of data collected, the desired text is, in some cases, acquired efficiently by classifying the text. Various classification techniques exist, including a technique of classifying text by each feature by assigning tags representing the text features. Here, tags are generally defined as metadata such as keywords and topics of the text itself. Which data is extracted from text data classified by tagging depends on the usage scenario of the user. For example, a tag, which is a majority tag attached to many texts due to a tagging trend, is sometimes used.

Meanwhile, minority tags appended to minority text data other than majority text data may also be used. However, it is difficult to determine which minority tag to select from among minority tags, and minority tags are more numerous than majority tags, and therefore confirming all the tags detracts from the advantages of tagging. A mixture of good and bad minority tags may include data that includes a few opinions and few exuberant moments but which is useful data. Therefore, a method for acquiring useful information from among minority tags is required.

PTL 1 discloses a method for extracting minority topic data.

CITATION LIST

Patent Literature

PTL 1: JP 2016-99868 A

SUMMARY OF INVENTION

Technical Problem

In PTL 1, in order to extract a minority cluster that should be extracted, classification can be performed even if there is an extreme bias in the number of instances of a topic. Specifically, dependency relationships of text documents are utilized and converted into patterns. By using a specific threshold value to process a pattern, a minority cluster is outputted. Here, a cluster means a group obtained through classification using a text classification method.

The method of PTL 1 also enables minority clusters to be extracted. However, there is no guarantee that clusters which have been classified based on words and grammar will be mentioned with regard to the same topic. For example, even if a "worry" cluster is considered, what users are worried about will differ for each user. Furthermore, the means for extracting, from an extracted minority cluster, the data representing the cluster is not disclosed.

An object according to one aspect of the present invention is to provide a technology that enables extraction, from data groups to which tags have been appended, of a few exuberant and useful minority tags from a data group in which a plurality of minority tags is present. Yet another object is to provide a technology enabling extraction, among extracted tags, of data representing a data group to which the same tag has been appended.

Solution to Problem

A data extraction system according to one aspect of the present invention is configured as a data extraction system, comprising: an input unit that receives an input of a data group in which tag ID-appended data and time information on time the tag ID-appended data was created are associated with each other; a tag extraction unit that counts the number of instances of the tag ID-appended data, to which a tag identified by a tag ID has been appended, occurring in each time slice for each tag ID included in the tag ID-appended data and for each time slice obtained by dividing a timeline including the time information by a predetermined duration, and that extracts the tags as a few exuberant and useful minority tags in a case where the counted number of instances is greater than a predetermined instance number threshold value and where a ratio of the time slices in which the number of instances does not satisfy a predetermined criterion is greater than a predetermined ratio threshold value; and a data extraction unit that determines, as data to be represented among minority tag ID-appended data, data in which a score satisfies a predetermined criterion, the score being obtained from an appearance rate of a word used in the minority tag ID-appended data obtained by analyzing, for each peak timezone of minority tag IDs for identifying the extracted minority tags, the minority tag ID-appended data to which a minority tag identified by the minority tag ID has been appended, and from an appearance rate of a word used in the minority tag ID-appended data obtained by analyzing, in the timeline for the minority tag IDs, the minority tag ID-appended data in the time slice in which the number of instances of the minority tag ID-appended data including the minority tag identified by the minority tag ID peaks.

Advantageous Effects of Invention

One aspect of the present invention enables extraction, from data groups to which tags have been appended, of a few exuberant and useful minority tags from a data group in which a plurality of minority tags is present. Furthermore, it is possible to extract, among extracted tags, data representing a data group to which the same tag has been appended.

Problems, configurations, advantageous effects, and the like other than those mentioned above will be clarified by the descriptions of the embodiments hereinbelow.

BRIEF DESCRIPTION OF DRAWINGS

FIG. 3 is a diagram illustrating an example of a text list to which a tag ID has been appended according to the first embodiment.

FIG. 6 is a diagram illustrating an example of a minority tag ID list according to the first embodiment.

FIG. 7 is a diagram illustrating an example of a timeline for each tag ID according to the first embodiment.

FIG. 9 is a diagram illustrating an example of a representative data list according to the first embodiment.

FIG. 10 is a diagram illustrating an example of a minority tag ID-appended text list according to the first embodiment.

FIG. 11 is a diagram illustrating an example of a word appearance rate list for each tag ID according to the first embodiment.

FIG. 12 is a diagram illustrating an example of a peak timezone list for each tag ID according to the first embodiment.

FIG. 15 is a diagram illustrating an example of a word score list according to the first embodiment.

FIG. 16 is a diagram illustrating an example of a text score list for each peak timezone of a tag ID according to the first embodiment.

FIG. 27 is a diagram illustrating an example of a tag similarity matrix according to the fourth embodiment.

FIG. 28 is a diagram illustrating an example of a minority tag ID score list according to the fourth embodiment.

DESCRIPTION OF EMBODIMENTS

Hereinafter, embodiments will be described with reference to the drawings. Note that the embodiments described hereinbelow do not limit the invention according to the claims. Moreover, not all of the elements and combinations thereof described in the embodiments are essential to the solution of the invention.

First Embodiment

Figure 1:
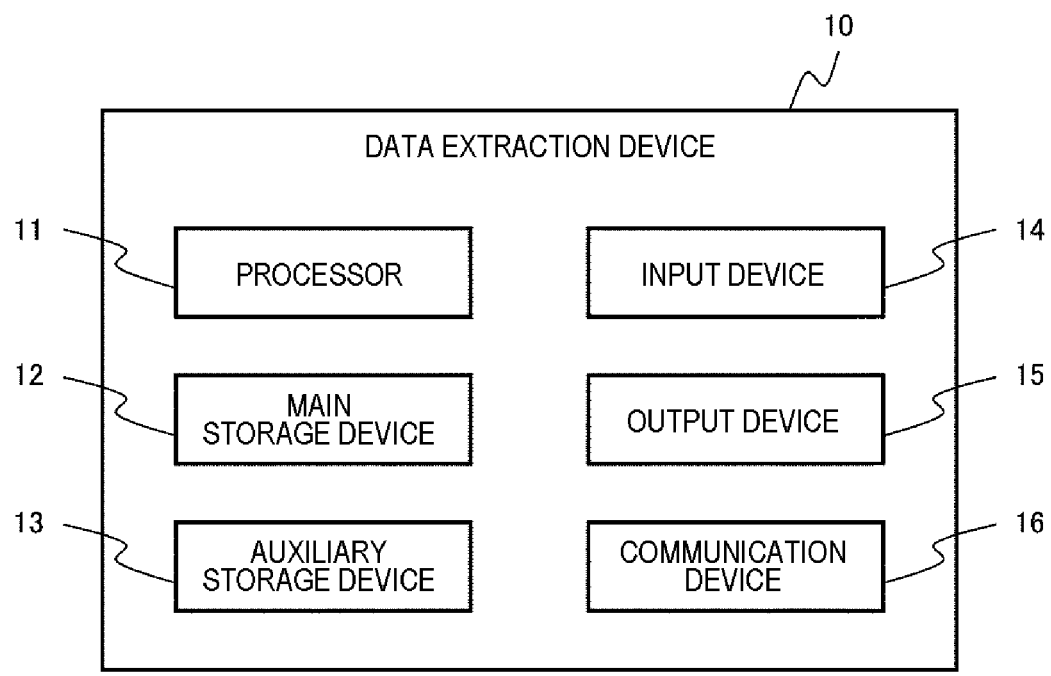
FIG. 1 is a diagram illustrating an example of a hardware configuration of a data extraction device according to a first embodiment.

FIG. 1 is a configuration diagram illustrating a hardware configuration of a data extraction device according to a first embodiment. A data extraction device 10, which is illustrated in FIG. 1, is, for example, an information processing device. The data extraction device 10 may be realized as a data extraction system such as a cloud server provided by a cloud system. The data extraction device 10 may be used for development, maintenance, and the like of a software system.

The data extraction device 10 illustrated in FIG. 1 includes a processor 11, a main storage device 12, an auxiliary storage device 13, an input device 14, an output device 15, and a communication device 16. These components are communicably connected to each other via communication means such as a bus (not illustrated).

The processor 11 is configured using, for example, a central processing unit (CPU), a micro processing unit (MPU), and the like. The processor 11 implements various functions of the text data collection device 10 by reading and executing a program stored in the main storage device 12. The main storage device 12 is a device that stores programs and data, and is, for example, a read only memory (ROM), a random access memory (RAM), a non-volatile semiconductor memory (non-volatile RAM (NVRAM)), or the like.

The auxiliary storage device 13 includes, for example, a hard disk drive, a solid state drive (SSD), an optical storage device (for example, a compact disc (CD), a digital versatile disc (DVD), or the like), an IC card, an SD memory card, and the like. Furthermore, a storage system, a cloud server, or the like may be used as the auxiliary storage device 13. The auxiliary storage device 13 stores programs and data. The programs and data stored in the auxiliary storage device 13 are loaded on the main storage device 12 as necessary.

The input device 14 includes, for example, a keyboard, a mouse, a touch panel, a card reader, a voice input device, and the like. The input device 14 receives various information from the user who uses the text data collection device 10. The output device 15 provides the user with various information such as the processing progress and processing result. The output device 15 is configured using, for example, a screen display device (liquid crystal monitor, a liquid crystal display (LCD), a graphic card, and the like), an audio output device (such as a loudspeaker), a printing device, and the like.

The communication device 16 is a wired or wireless communication interface that realizes communication with other devices via a communication means such as a LAN or the Internet, and is configured using, for example, a network interface card (NIC), a wireless communication module, a universal serial interface (USB) module, a serial communication module, or the like.

Note that information inputs and outputs may be performed to/from another device (not illustrated) via the communication device 16. In addition, the data extraction device 10 may include hardware such as an application-specific integrated circuit (ASIC), separately from the above configuration.

Figure 2:
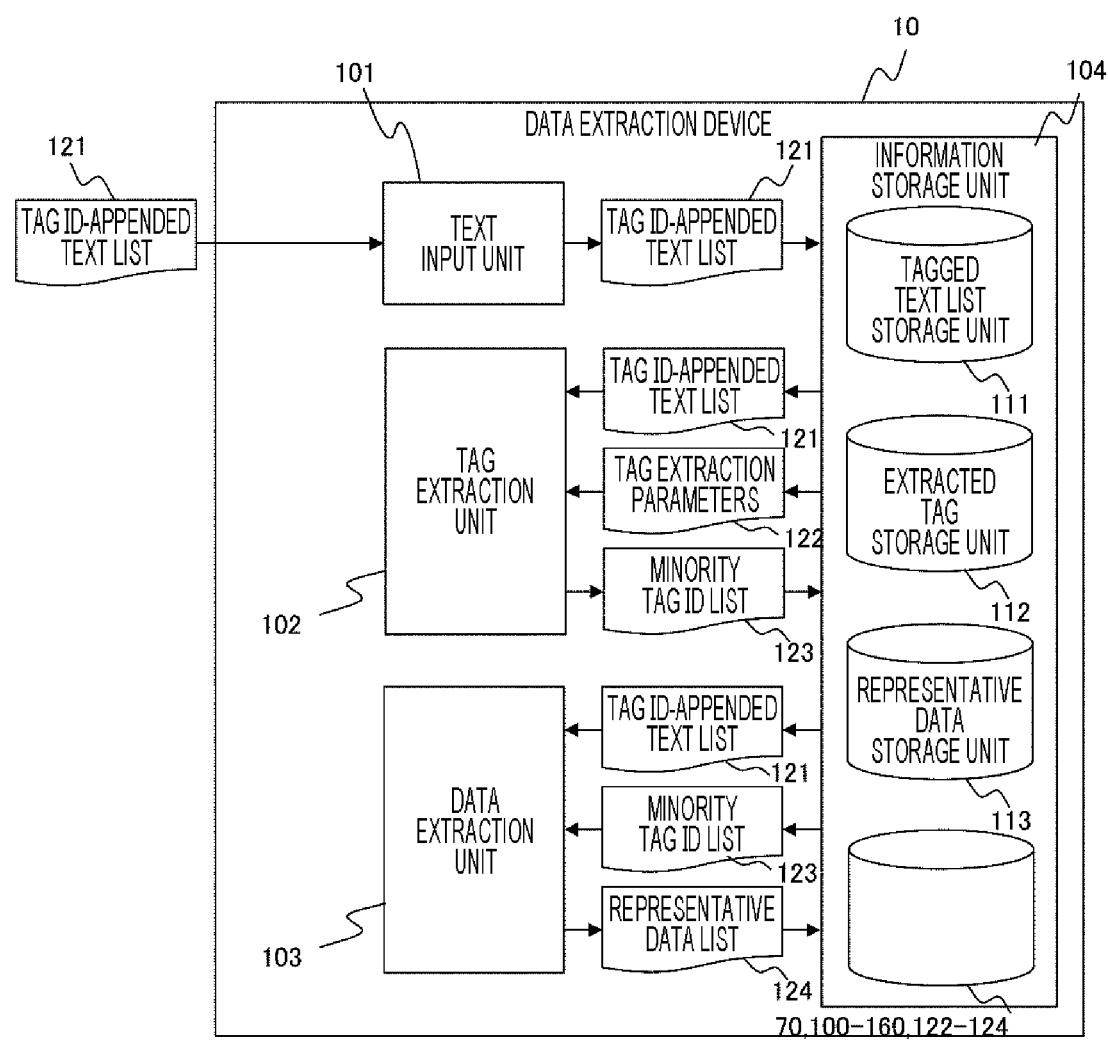
FIG. 2 is a diagram illustrating an example of a functional configuration of the data extraction device according to the first embodiment.

FIG. 2 is a diagram illustrating an example of a functional configuration of the data extraction device 10 according to the first embodiment. As illustrated in FIG. 2, the data extraction device 10 includes a text input unit 101, a tag extraction unit 102, a data extraction unit 103, and an information storage unit 104. Furthermore, the information storage unit 104 includes a tagged text list storage unit 111, an extracted tag storage unit 112, and a representative data storage unit 113. The tagged text list storage unit 111 stores a tag ID-appended text list 121, the extracted tag storage unit 112 stores a minority tag ID list 123, and the representative data storage unit 113 stores a representative data list 124. Note that the information storage unit 104 may also store information or the like referred to and generated by the text input unit 101, the tag extraction unit 102, and the data extraction unit 103. Examples thereof include a tag extraction parameter 122 (FIG. 5), the minority tag ID list 123 (FIG. 6), a timeline 70 (FIG. 7) for each tag ID, the representative data list 124 (FIG. 9), a minority tag ID-appended text list 100 (FIG. 10), a word appearance rate list 110 (FIG. 11) for each tag ID, a peak timezone list 120 (FIG. 12) for each tag ID, a peak timezone text list 130 (FIG. 13) for each peak timezone of a tag ID, a word appearance rate list 140 (FIG. 14) for each peak timezone of a tag ID, a word score list 150 (FIG. 15), and a text score list 160 (FIG. 16) for each peak timezone of a tag ID, all of which will be described below. The same applies to the second to fourth embodiments.

Each unit of the data extraction device 10 illustrated in FIG. 2 is realized by any one or more configurations of the devices 11 to 16 illustrated in FIG. 1. For example, at least one of the units may be implemented by the processor 11 reading and executing a program stored in the main storage device 12 or the auxiliary storage device 13. In addition, at least one of the units may be realized using hardware such as an ASIC.

The text input unit 101 illustrated in FIG. 2 is an input unit that receives the tag ID-appended text list 121, which is a target of data extraction. The text input unit 101 stores the received tag ID-appended text list 121 in the tagged text list storage unit 111 of the information storage unit 104.

FIG. 3 is a diagram illustrating an example of the tag ID-appended text list 121 according to the first embodiment.

The tag ID-appended text list 121 illustrated in FIG. 3 has tag ID-appended texts 301 as records, and the tag ID-appended texts 301 include text 302, time information 303, and a tag ID 304. In FIG. 3, for example, text 1 indicates text to which tags identified by the tag IDs "tag ID001" and "tag ID002" are appended at the time "2020/07/23 17:58:36".

Figure 4:
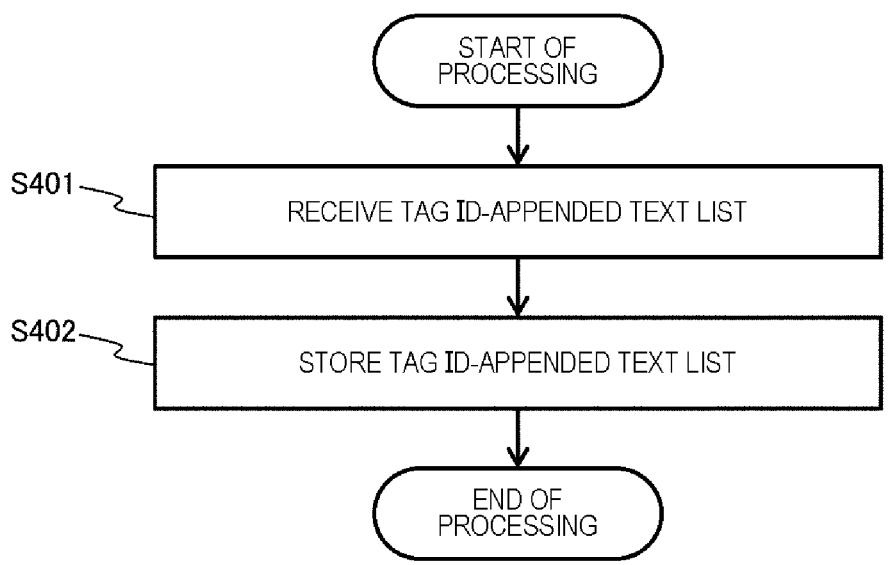
FIG. 4 is a flowchart illustrating an example of an operation of a text input unit of the data extraction device according to the first embodiment.

FIG. 4 is a flowchart to illustrate an example of an operation of the text input unit 101 according to the first embodiment.

First, the text input unit 101 receives the tag ID-appended text list 121 (step S401). At this time, the text input unit 101 may receive the tag ID-appended text list 121 directly inputted by the user to the input device 14, or may access a storage location designated by the user and receive the tag ID-appended text list 121 from the storage location. In the latter case, for example, the tag ID-appended text list 121 is stored in advance in a storage location which is accessible by the data extraction device 10, and the user inputs information designating the storage location to the input device 14. In this case, the text input unit 101 accesses the storage location on the basis of the inputted information, and receives the tag ID-appended text list 121 from the storage location.

Next, the text input unit 101 stores the tag ID-appended text list 121 in the tagged text list storage unit 111 (step S402).

The tag extraction unit 102 illustrated in FIG. 2 reads the tag ID-appended text list 121 from the tagged text list storage unit 111 of the information storage unit 104, and reads the tag extraction parameters 122 from the information storage unit 104. The user directly inputs the tag extraction parameters 122 to the information storage unit 104 in advance via the input device 14 of the data extraction device 10. The tag extraction unit 102 creates a minority tag ID list 123 on the basis of the tag ID-appended text list 121 and the tag extraction parameters 122, and stores the minority tag ID list in the extracted tag storage unit 112 of the information storage unit 104.

Figure 5:
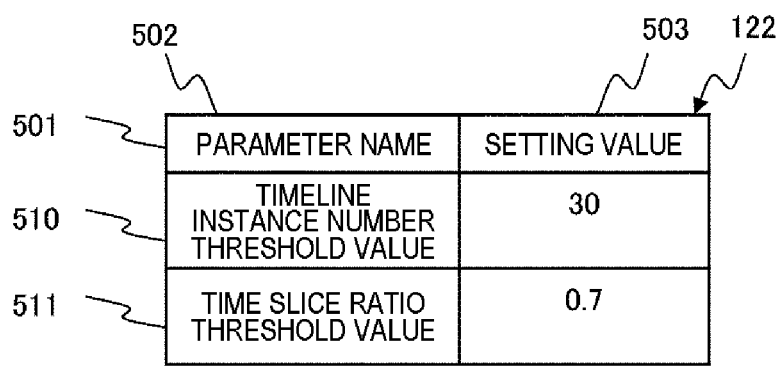
FIG. 5 is a diagram illustrating an example of tag extraction parameters according to the first embodiment.

FIG. 5 is a diagram illustrating an example of tag extraction parameters 122 according to the first embodiment. The tag extraction parameters 122 illustrated in FIG. 5 have tag extraction parameters 501 as records, and the tag extraction parameters 501 include a parameter name 502 of the extraction parameter and a setting value 503 which is a setting value for the parameter. The parameter name 502 of the tag extraction parameter 501 includes a timeline instance number threshold value 510 and a time slice ratio threshold value 511.

The timeline instance number threshold value 510 indicates a threshold value used when a tag is acquired. For example, a value such as "30" is set as the setting value 503 of the timeline instance number threshold value 510.

The time slice ratio threshold value 511 indicates the threshold value used when a tag is acquired. For example, a value such as "0.7" is set as the setting value 503 of the time slice ratio threshold value 511.

A time slice represents a timezone obtained by dividing a time axis that can be taken by the time information 303 of the tag ID-appended text list 121 by a predetermined duration. Furthermore, a timeline is a time-series list including time slices and the number of texts occurring in the timezone.

FIG. 6 is a diagram illustrating an example of a minority tag ID list 123 according to the first embodiment. The minority tag ID list 123 illustrated in FIG. 6 includes a list of minority tag IDs 601 which are extracted by the tag extraction unit 102. FIG. 6 illustrates, for example, that tags whose tag IDs are identified by the "tag ID001", "tag ID033", and "tag ID091" are extracted as the minority tag IDs 601.

FIG. 7 is a diagram illustrating an example of a timeline 70 for each tag ID which is created and used during the operation of the tag extraction unit according to the first embodiment. A timeline 70 for each tag ID illustrated in FIG. 7 has timelines 701 as records, and includes time slices 702 and the number of instances 703 of texts occurring in the timezone. Note that the duration of the time slice 702 in FIG. 7 is one hour, but the duration is adjusted according to the number of data to be handled, the data acquisition period, and the like. FIG. 7 illustrates, for example, that for a tag identified by a certain tag ID, there are 0 texts including the tag identified by the tag ID in the time slice "2020/07/23 16:00 to 16:59:59" constituting a certain timeline, 34 texts including the tag identified by the tag ID in the time slice "2020/07/23 17:00 to 17:59:59", and 8 texts including the tag identified by the tag ID in the time slice "2020/07/23 18:00 to 18:59:59".

Figure 8:
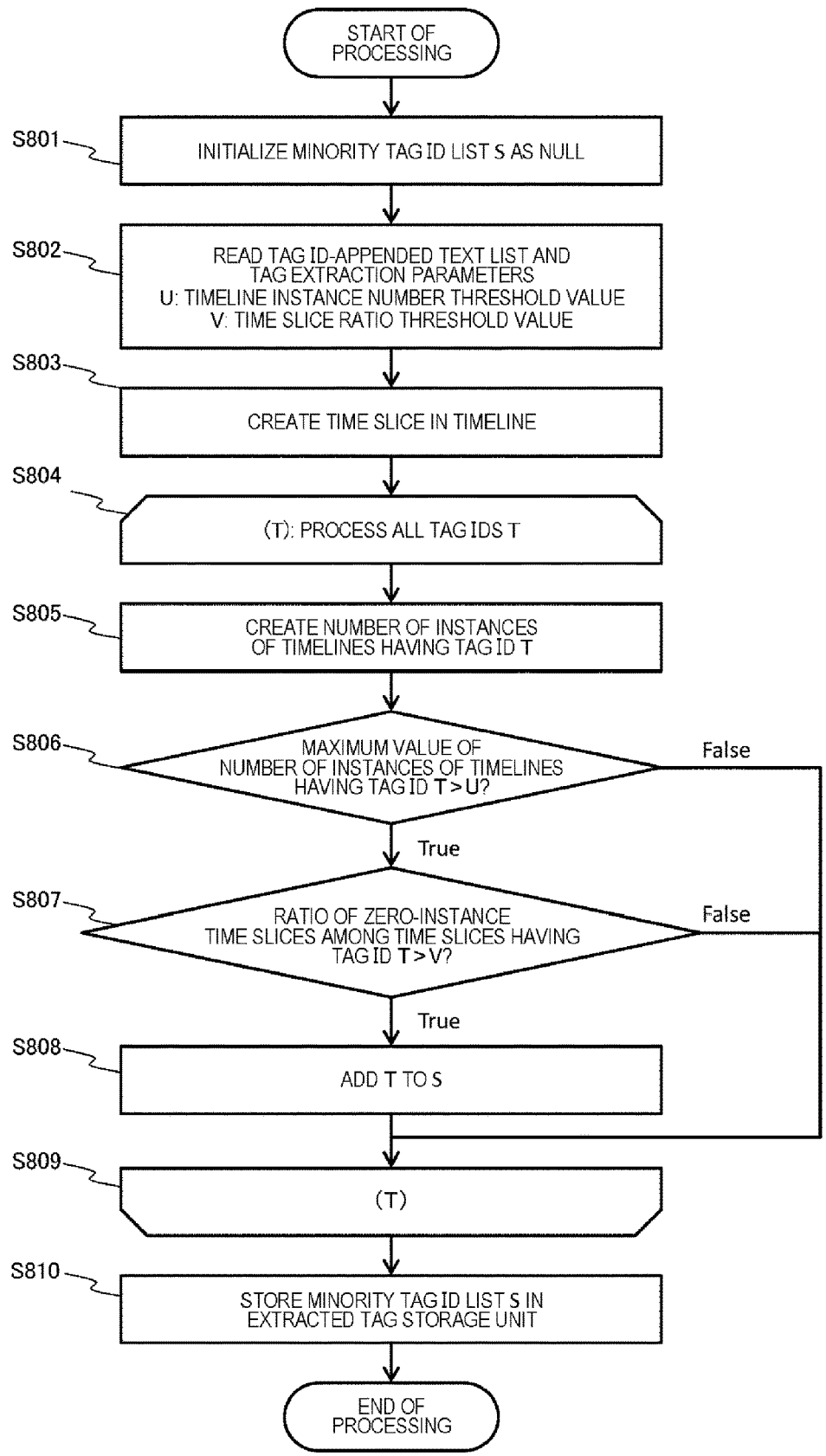
FIG. 8 is a flowchart illustrating an example of an operation of a tag extraction unit of the data extraction device according to the first embodiment.

FIG. 8 is a flowchart to illustrate an example of an operation of the tag extraction unit 102 of the data extraction device 10 according to the first embodiment. By performing the following operation, in a case where tagged data to which tags have been appended and information on the time the data was created are inputted, it is possible to extract minority tags according to the number of instances of time series-based data and the data appearance frequency, on the basis of time series information for a data group to which the same tag has been appended among the data groups.

First, the tag extraction unit 102 initializes the list S of the minority tag ID list 123 (step S801).

Subsequently, the tag extraction unit 102 receives the tag ID-appended text list 121 and the tag extraction parameters 122 (step S802). For example, "30", which is the setting value 503 of the timeline instance number threshold value 510 of the tag extraction parameter 122 in FIG. 5, is set as a variable U for the timeline instance number threshold value. "0.7", which is the setting value 503 of the time slice ratio threshold value 511 of the tag extraction parameter 122, is set as a variable V of the ratio threshold value of the timeline.

Subsequently, the tag extraction unit 102 creates time slices 702 in the timeline 70 from the tag ID-appended text list 121 (step S803). For example, with regard to the time slices 702 of the timeline 70 in FIG. 7, the oldest time information and the latest time information of the time information 303 in the tag ID-appended text 301 of the tag ID-appended text list 121 of FIG. 3 are treated as a start and an end, and time slices 702 are created having a duration of one hour.

Subsequently, the tag extraction unit 102 repeats the processing of steps S805 to S809 as the loop processing T for each and every tag ID (step S804). Note that all tag IDs are all included in the tag ID 304 appended in tag ID-appended text list 121 in FIG. 3.

In the loop processing T, the tag extraction unit 102 creates the number of instances 703 of timelines 70 of T, which is the target tag ID (step S805). A copy of the timelines 70 created in step S803 is created. Next, the number of instances 703 of timelines 70 having the tag ID T is created based on time information 303 in text 302 to which the same tag is appended with the tag ID 304 of the tag ID-appended text list 121. For example, all of text 1, text 2, and text 3 of text 302 of the tag ID-appended text list 121 in FIG. 3 are generated in the timezone of "2020/07/23 17:00 to 17:59:59", and for a certain tag (for example, the tag "tag ID001"), the number of instances 703 of "2020/07/2317:00:00 to 17:59:59" in the time slice 702 of the timeline 70 in FIG. 7 is "34" instances that include texts 1 to 3.

Subsequently, in the loop processing T, the tag extraction unit 102 makes a determination based on the maximum value of the number of instances of timelines having the target tag ID T and the timeline instance number threshold value U (step S806). In a case where the maximum value of the number of instances of timelines having the target tag ID T is not greater than the timeline instance number threshold value U (step S806; False), the processing of the tag ID T is terminated, and the processing advances to the next processing. In a case where the maximum value of the number of instances of timelines having the target tag ID T is greater than the timeline instance number threshold value U (step S806; True), the processing advances to step S807 of the next processing. For example, "34", which is the maximum number of the number of instances 703 of timelines 70 having the tag ID T in FIG. 7, is greater than the timeline instance number threshold value U "30". At this time, the processing advances to step S807 of the next processing.

Subsequently, in the loop processing T, the tag extraction unit 102 makes a determination based on the ratio of zero-instance time slices among the time slices having the target tag ID T and the time slice ratio threshold value V (step S807).

In a case where the ratio of zero-instance time slices among the time slices having the target tag ID T is not greater than the time slice ratio threshold value V (step S807; False), the processing of the tag ID T is terminated, and the processing advances to the next processing. In a case where the ratio of zero-instance time slices among the time slices having the target tag ID T is greater than the time slice ratio threshold value V (step S807; True), the processing advances to step S808 of the next processing. For example, in a case where there are 1000 records for the number of timelines 701 included in the timelines 70 having the tag ID T in FIG. 7 and, among these records, there are 800 records for which the number of instances 703 is "0", the time slice ratio is 0.8 and is greater than "0.7", which is the setting value 503 of the time slice ratio threshold value 511 of the tag extraction parameter 122. At this time, the processing advances to step S808 of the next processing. Note that, in step S807 of FIG. 8, zero-instance time slices among the time slices are set as determination targets, but 5 or fewer time slices may be set as determination targets depending on the number of data to be handled, the acquisition period, and the like.

Subsequently, in the loop processing T, the tag extraction unit 102 adds the tag ID T to the list S of the minority tag ID list 123 (step S808).

When the processing of steps S805 to S808 is executed for all the tag IDs T, the tag extraction unit 102 exits the loop processing T (step S809).

Subsequently, the tag extraction unit 102 stores the list S of the minority tag ID list 123 in the extracted tag storage unit 112 (step S810).

As described above, by performing the processing of step S807 in FIG. 8, in a case where, in a certain timeline that includes a plurality of time slices, the number of time slices is zero at a certain ratio or more and tagging is not performed, it is determined that there is no exuberance across the whole timeline. Furthermore, by performing the processing of step S806, in a case where the maximum value of the number of instances of timelines is equal to or greater than the threshold value, it is determined that there is only exuberance in the timezone of a certain time slice of the timeline. Therefore, a tag indicating that there is no exuberance overall in a certain timeline but there is exuberance in a certain timezone can be extracted as a minority tag. That is, among data groups to which tags have been appended, a few exuberant and useful minority tags can be extracted from a data group in which a plurality of minority tags is present.

The data extraction unit 103 illustrated in FIG. 2 reads the tag ID-appended text list 121 from the tagged text list storage unit 111 of the information storage unit 104, and the minority tag ID list 123 from the extracted tag storage unit of the information storage unit 104. The data extraction unit 103 creates the representative data list 124 on the basis of the tag ID-appended text list 121 and the minority tag ID list 123, and stores the representative data list in the representative data storage unit 113 of the information storage unit 104.

FIG. 9 is a diagram illustrating an example of a representative data list 124 according to the first embodiment. The representative data list 124 illustrated in FIG. 9 has the representative data 901 as records, and the representative data 901 include a tag ID 902, a peak time slice 903, a text 904, and time information 905. In FIG. 9, for example, a tag having a tag ID, which is a minority tag ID and identified by "tag ID001", indicates that the peak time slice, which is a time slice for which the peak time has been reached, is the timezone "2020/07/23 17:00:00 to 17:59:59", and the time when the tag was tagged to the text 1 is "2020/7/23 17:58:36".

FIG. 10 is a diagram illustrating an example of the minority tag ID-appended text list 100, which is created and used during the operation of the data extraction unit according to the first embodiment. The minority tag ID-appended text list 100 illustrated in FIG. 10 has minority tag ID-appended texts 1001 as records, and the minority tag ID-appended texts 1001 includes a text 1002, time information 1003, and used words 1004. Specifically, as will be described below, the minority tag ID-appended text list 100 is created from the tag ID-appended text list 121. FIG. 10 illustrates, for example, that in text 1 to which a tag identified by "tag ID001" constituting a minority tag is appended, word 1 and word 2 are used at the time "2020/7/23 17:58:36".

Figures 11, 12:
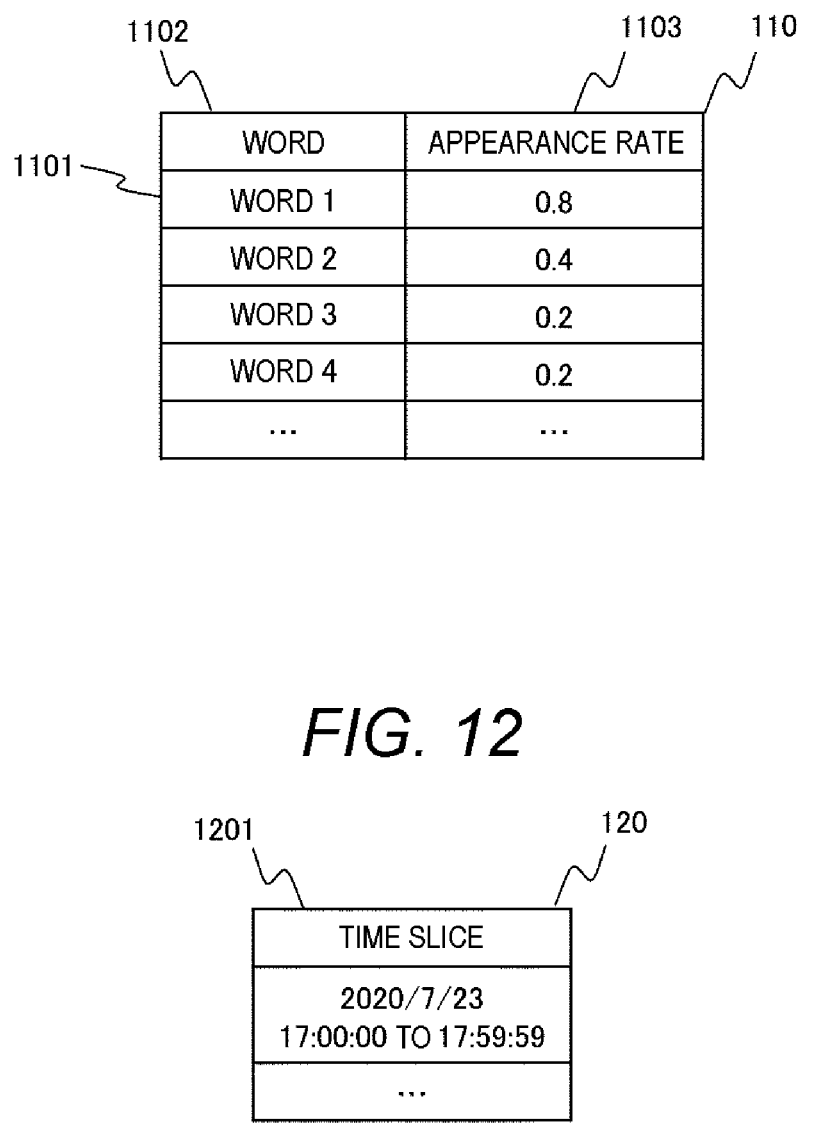

FIG. 11 is a diagram illustrating an example of the word appearance rate list 110 for each tag ID which is created and used during the operation of the data extraction unit according to the first embodiment. The word appearance rate list 110 illustrated in FIG. 11 has word appearance rates 1101 as records, and the word appearance rates 1101 include a word 1102 and an appearance rate 1103. Specifically, as will be described below, the word appearance rate list 110 for each tag ID is created in the processing illustrated in FIGS. 17A and 17B. FIG. 11 illustrates that, for example, the appearance rate of the used word "word 1" in a data group to which a tag identified by a certain tag ID is appended is "0.8".

FIG. 12 is a diagram illustrating an example of a peak timezone list 120 for each tag ID which is created and used during the operation of the data extraction unit according to the first embodiment. The peak timezone list 120 illustrated in FIG. 12 includes a list of time slices 1201 of the extracted peak timezone. Specifically, as will be described below, the peak timezone list 120 for each tag ID is created in the processing illustrated in FIGS. 17A and 17B. FIG. 12 illustrates, for example, that a timezone of "2020/07/23 17:00:00 to 17:59:59" is extracted as a peak time slice of a tag identified by a certain tag ID.

Figure 13:
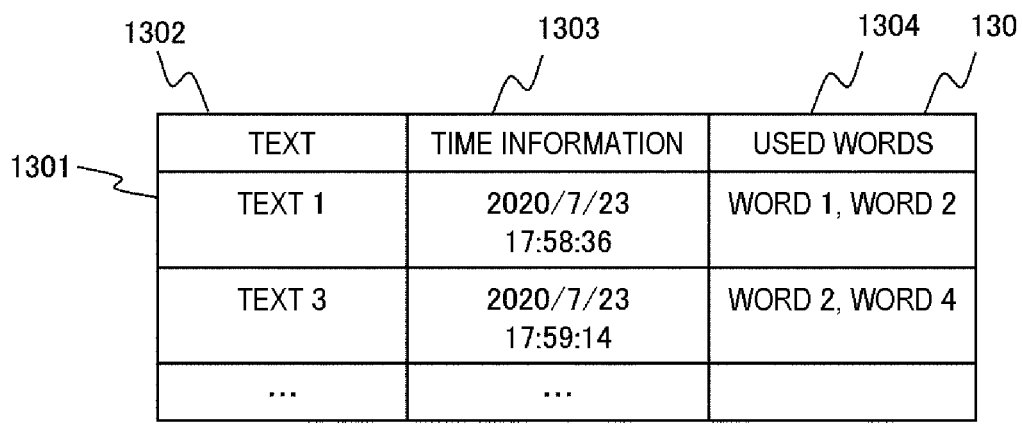
FIG. 13 is a diagram illustrating an example of a peak timezone text list for each peak timezone of a tag ID according to the first embodiment.

FIG. 13 is a diagram illustrating an example of the peak timezone text list 130 for each peak timezone of a tag ID which is created and used during the operation of the data extraction unit according to the first embodiment. The peak timezone text list 130 illustrated in FIG. 13 has peak timezone texts 1301 as records, and the peak timezone texts 1301 include text 1302, time information 1303, and used words 1304. Specifically, as will be described below, the peak timezone text list 130 for each peak timezone of the tag ID is created in the processing illustrated in FIGS. 17A and 17B. In FIG. 13, for example, there is a text 1 as a text included in the peak time slice of the tag ID, and the text 1 indicates that a word 1 and a word 2 are used at the time "2020/7/23 17:58:36".

Figure 14:
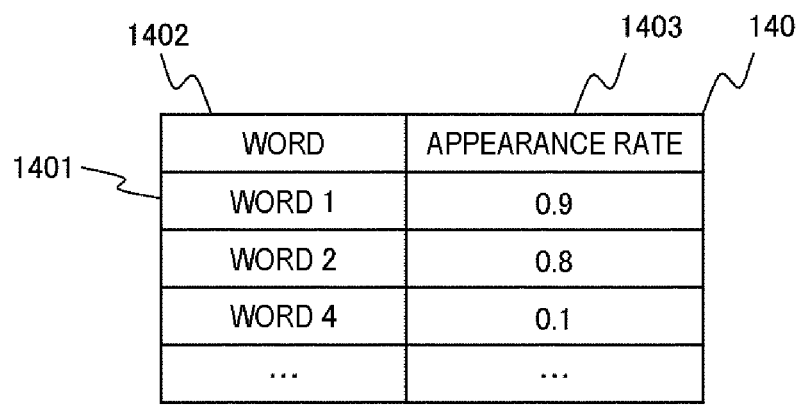
FIG. 14 is a diagram illustrating an example of a word appearance rate list for each peak timezone of a tag ID according to the first embodiment.

FIG. 14 is a diagram illustrating an example of the word appearance rate list 140 for each peak timezone of a tag ID which is created and used during the operation of the data extraction unit according to the first embodiment. The word appearance rate list 140 illustrated in FIG. 14 has word appearance rates 1401 as records, and the word appearance rates 1401 include a word 1402 and an appearance rate 1403. Specifically, as will be described below, the word appearance rate list 140 for each peak timezone of the tag ID is created in the processing illustrated in FIGS. 17A and 17B. FIG. 14 illustrates that, for example, the appearance rate of the used word "word 1" in the data group appended with the tag identified by a certain tag ID included in the peak time slice is "0.9".

FIG. 15 is a diagram illustrating an example of the word score list 150 which is created and used during the operation of the data extraction unit according to the first embodiment. The word score list 150 illustrated in FIG. 15 has word scores 1501 as records, and the word scores 1501 include a word 1502 and a score 1503. Although specifically described below, the word score list 150 is created in the processing illustrated in FIGS. 17A and 17B. FIG. 15 illustrates that, for example, for a tag identified by a certain tag ID, a difference "0.1" between the appearance rate 0.9 of the word 1 in the timezone of the peak time slice illustrated in FIG. 14 and the appearance rate 0.8 of the word 1 in a timezone other than the peak time slice illustrated in FIG. 11 is calculated as the score.

FIG. 16 is a diagram illustrating an example of the text score list 160 for each peak timezone of a tag ID which is created and used during the operation of the data extraction unit according to the first embodiment. The text score list 160 illustrated in FIG. 16 has text scores 1601 as records, and the text scores 1601 include a text 1602, time information 1603, and a score 1604. Specifically, as will be described below, the text score list 160 for each peak timezone of tag IDs is created in the processing illustrated in FIGS. 17A and 17B. In FIG. 16, for example, in the peak timezone text list 130 for each peak timezone of the tag ID illustrated in FIG. 13, the used words in text 1 are word 1 and word 2. It can thus be seen that the score of text 1 including these words in FIG. 15 is expressed as "0.5". Furthermore, the time at which these words are used is the time "2020/7/23 17:58:36", as illustrated in FIG. 13.

Figure 17A:
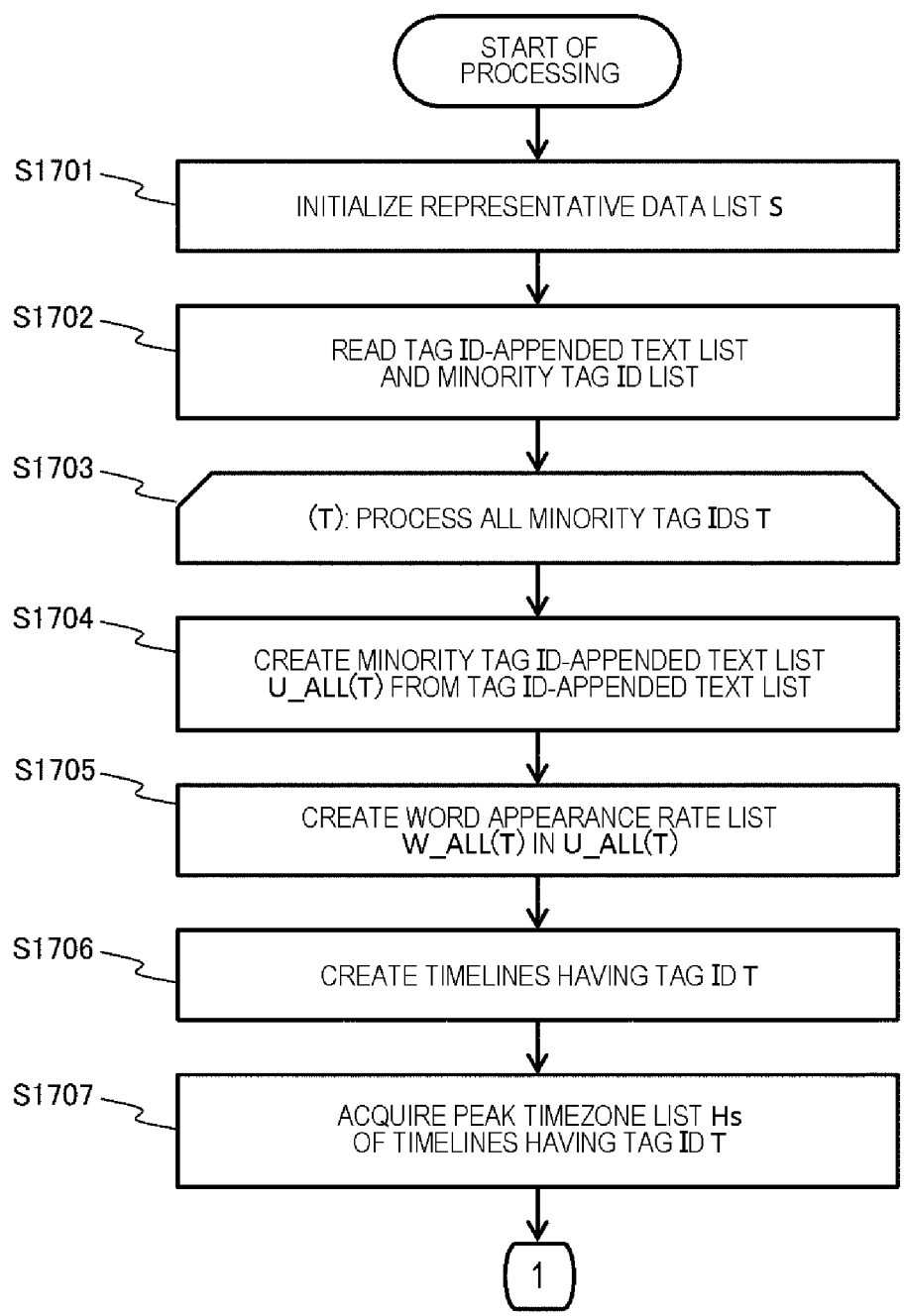
FIG. 17A is a flowchart illustrating an example of an operation of a data extraction unit of the data extraction device according to the first embodiment.
Figure 17B:
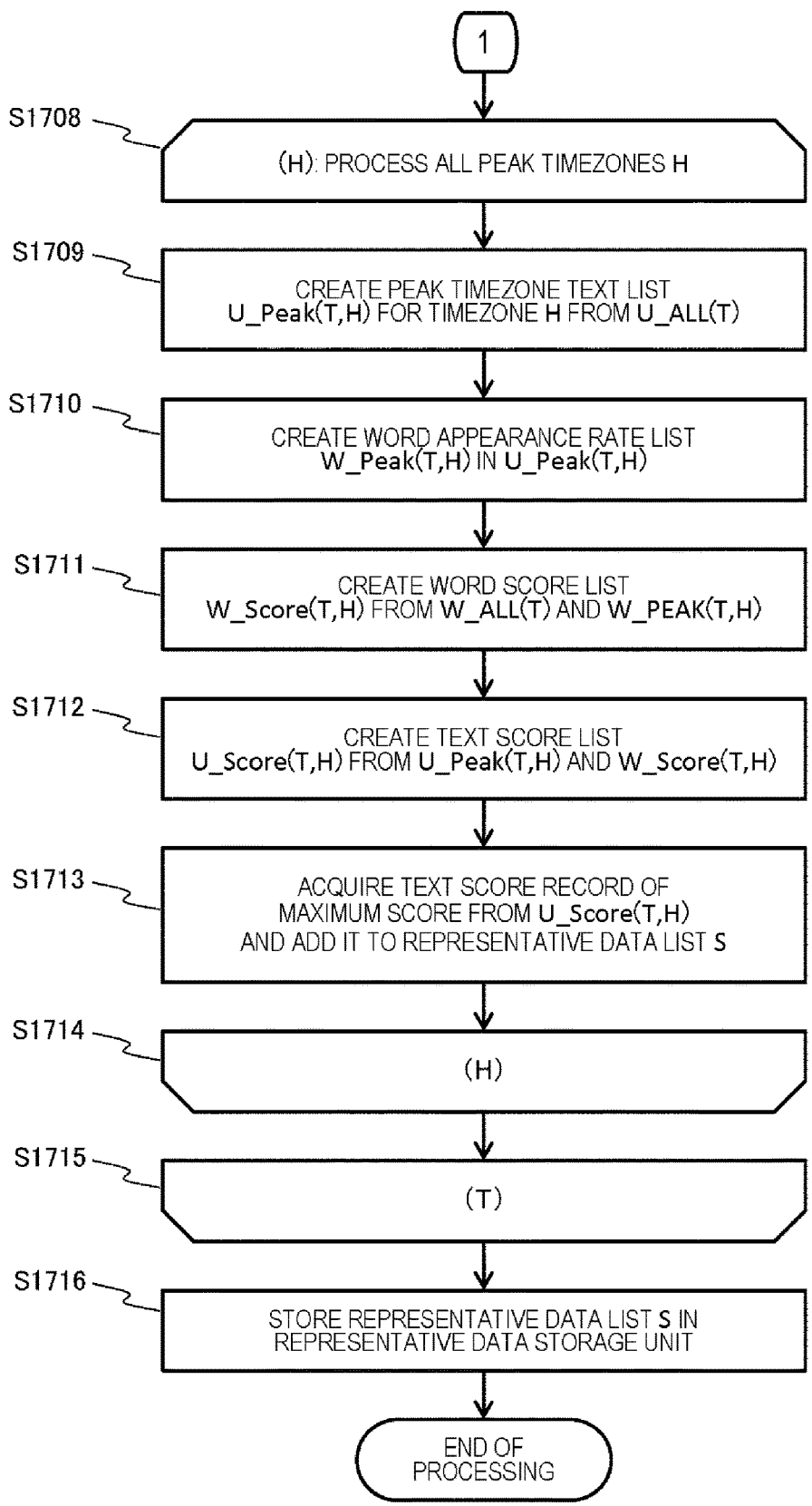
FIG. 17B is a flowchart illustrating an example of an operation of the data extraction unit of the data extraction device according to the first embodiment.

FIGS. 17A, 17B are flowcharts to illustrate an example of operation of the data extraction unit 103 according to the first embodiment.

First, the data extraction unit 103 initializes the representative data list 124 (step S1701).

Subsequently, the data extraction unit 103 reads the tag ID-appended text list 121 and the minority tag ID list 123 (step S1702).

The data extraction unit 103 then repeats the processing of steps S1704 to S1715 as the loop processing T for each and every minority tag ID (step S1703).

Specifically, the processing is repeated by the number of records of the minority tag ID 601 in the minority tag ID list 123.

In the loop processing T, the data extraction unit 103 creates the minority tag ID-appended text list 100 from the tag ID-appended text list 121 for T, which is the target minority tag ID (step S1704). U_ALL(T) is the minority tag ID-appended text list 100 for the minority tag ID T. For example, when only the records to which the tag ID 304 "tag ID001" is appended are extracted from the tag ID-appended text list 121 of FIG. 3, the texts 1002 and the time information 1003 of the minority tag ID-appended texts 1001 in the minority tag ID-appended text list 100 of FIG. 10 are created. Note that used words 1004 remains null in step S1704.

Subsequently, in the loop processing T, the data extraction unit 103 creates the word appearance rate list 110 in the minority tag ID-appended text list 100 of the target minority tag ID T (step S1705). W_ALL(T) is the word appearance rate list 110 for the minority tag ID T. For example, the words to be used are acquired from each text 1002 for all the minority tag ID-appended texts 1001 included in the minority tag ID-appended text list 100 of FIG. 10, and the used words 1004 are created. At this time, a general morphological analysis technique or the like may be used for the processing to acquire the words. Next, the words 1102 and the appearance rates 1103 in the word appearance rate list 110 of FIG. 11 are created based on the minority tag ID-appended text list 100 of FIG. 10. The words 1102 in the word appearance rate list 110 are all the words included in the used words 1004 in the minority tag ID-appended text list 100. The appearance rate 1103 of the word appearance rate list 110 is the ratio at which a specific word is used in the texts 1002 among all records of the minority tag ID-appended texts 1001 in the minority tag ID-appended text list 100.

Subsequently, in the loop processing T, the data extraction unit 103 creates the timeline 70 having the target minority tag ID T (step S1706). Note that the timeline 70 having the target minority tag ID T is created by a procedure similar to step S804 of the tag extraction unit 102.

Subsequently, in the loop processing T, the data extraction unit 103 creates the peak timezone list 120 of the timeline 70 having the target minority tag ID T (step S1707). For example, a time slice 702 with a temporarily sharp increase in the number of instances is acquired from the timeline 70 having the minority tag ID T, and a time slice 1201 of the peak timezone list 120 is created. Note that a general abnormality detection technique or the like may be used for the processing to acquire the peak timezone. For example, when an outlier detection technique that is a type of abnormality detection technique is applied to the timeline 70 illustrated in FIG. 7, the time slice at "2020/7/23 17:00:00 to 17:59:59" is detected as the peak timezone, and thus the time slice may be recorded as the time slice 1201 of the peak timezone list 120.

Subsequently, in the loop processing T, the data extraction unit 103 repeats the processing of steps S1710 to S1714 as the loop processing H for every peak timezone acquired in step S1707 (step S1708). Specifically, the processing is repeated a number of times corresponding to the number of records in the peak timezone list 120 of FIG. 12.

In the loop processing H, the data extraction unit 103 creates a peak timezone text list 130 for the peak timezone H having the target minority tag ID T (step S1709). The peak timezone text list 130 for the peak timezone H having the minority tag ID T is set as U_Peak(T, H). For example, based on the time slice 1201 "2020/7/23 17:00:00 to 17:59:59" of the peak timezone list 120 in FIG. 12, the records of the corresponding minority tag ID-appended texts 1001 of text 1 and text 3 are acquired from the time information 1003 of the minority tag ID-appended text list 100 in FIG. 10, and the peak timezone text list 130 is created.

In the loop processing H, the data extraction unit 103 creates the word appearance rate list 140 in the peak timezone text list U_Peak(T, H) 130 for the peak timezone H having the target minority tag ID T (step S1710). W_Peak (T, H) is the word appearance rate list 140 for U_Peak(T, H). The words 1402 and the appearance rates 1403 in the word appearance rate list 140 of FIG. 14 are created based on the peak timezone text list 130 of FIG. 13. The words 1402 in the word appearance rate list 140 are all the words included in the used words 1304 in the peak timezone text list 130. The appearance rates 1403 of the word appearance rate list 140 are rates at which a specific word is used in the texts 1302 among all the records of the peak timezone texts 1301 in the peak timezone text list 130.

In the loop processing H, the data extraction unit 103 creates the word score list 150 from the word appearance rate list W_ALL(T) 110 for the minority tag ID T and the word appearance rate list W_Peak(T, H) 140 for the peak timezone H, with respect to the peak timezone H having the target minority tag ID T (step S1711). W_Score(T, H) is the word score list 150 for the peak timezone H having the minority tag ID T. For example, when comparing the word appearance rate list W_ALL(T) 110 of FIG. 11 with the word appearance rate list W_Peak(T, H) 140 of FIG. 14 and subtracting the appearance rate 1103 "0.8" of the word appearance rate list W_ALL(T, H) 110 from the appearance rate 1403 "0.9" of the word appearance rate list W_Peak(T, H) 140 for the same word 1, the score 1503 of "word 1" of the word 1502 among the word scores 1501 of the word score list 150 of FIG. 15 is "0.1". As a result, the peak timezone and the whole timezone are compared, and a word characterizing the peak timezone is extracted. Note that the scores 1503 of the word score list 150 may also be calculated using another calculation procedure.

In the loop processing H, the data extraction unit 103 creates the text score list 160 based on the peak timezone text list U_Peak(T, H) 130 and the word score list W_Score (T, H) 150 for the peak timezone H having the target minority tag ID T (step S1712). U_Score(T, H) is the text score list 160 for the peak timezone H having the minority tag ID T. For example, the text 1302 and the time information 1303 of the peak timezone text 1301 of the peak timezone text list U_Peak(T, H) 130 of FIG. 13 are acquired, and the text 1602 and the time information 1603 of the text score 1601 of the text score list 160 of FIG. 16 are created. Furthermore, regarding the "text 1" of the peak timezone text 1301 of the peak timezone text list U_Peak(T, H) 130 of FIG. 13, the used words 1304 are "word 1" and "word 2", and when the score 1503 "0.1" of the word 1502 "word 1" and the score 1503 "0.4" of the word 1502 "word 2" among the word scores 1501 in the word score list W_Score(T, H) 150 of FIG. 15 are added together, the score 1604 "0.5" of the text 1602 "text 1" among the text scores 1601 in the text score list 160 of FIG. 16 is obtained. As a result, texts having the word characterizing the peak timezone are extracted. Note that the scores 1604 of the text score list 160 may also be calculated using another calculation procedure.

In the loop processing H, the data extraction unit 103 acquires the record having the maximum score 1604 in the text score list U_Score(T, H) 160 for the peak timezone H having the target minority tag ID T and adds the record to the representative data list 124 (step S1713). For example, among the records of the text score 1601 of the text 1602 "text 1" having the maximum score 1604 of "0.5" in the text score list U_Score(T, H) 160 in FIG. 16, the text 1602 "text 1" and the time information 1603 "2020/7/23 17:58:36" are acquired and added to the text 904 and the time information 905 of the representative data 901 of the representative data list 124 in FIG. 9. At this time, in the representative data 901 of the representative data list 124 in FIG. 9, the tag ID 902 passes the minority tag ID T being processed, and the peak time slice 903 passes the peak timezone H having the minority tag ID T being processed.

When the processing of steps S1709 to S1713 is executed for the peak timezone H of all the minority tag IDs T, the data extraction unit 103 exits the loop processing H (step S1714).

Upon executing the processing of steps S1704 to S1714 for all the minority tag IDs T, the data extraction unit 103 exits the loop processing T (step S1715).

Subsequently, the data extraction unit 103 stores the representative data list 124 in the representative data storage unit 113 (step S1716).

As described above, by performing the processing illustrated in FIGS. 17A and 17B, it is possible to extract data representing a data group to which the same tag has been appended among the minority tags extracted in FIG. 8. That is, among the minority tags extracted in FIG. 8, data representing a data group to which the same tag has been appended can be determined and provided based on word scores according to the appearance frequency over time of the words appearing in the data group to which the same tag has been appended.

As described above, according to the present embodiment, the present invention comprises: an input unit (for example, the text input unit 101) that receives an input of a data group in which tag ID-appended data (for example, the tag ID-appended text list 121) to which one or a plurality of tag IDs have been appended and information (for example, the time information 303) on time the tag ID-appended data was created are associated with each other; a tag extraction unit that counts the number of instances of the tag ID-appended data (for example, the number of instances 703 of the timeline 70), to which a tag identified by the tag ID has been appended, occurring in each time slice for each tag ID included in the tag ID-appended data and for each time slice (for example, the time slice 702 in the timeline 70), which is a timezone obtained by dividing a timeline (for example, the timeline 70 of each tag ID) including the time information by a predetermined duration, and that extracts the tags as a few exuberant and useful minority tags in a case (for example, step S806; True) where the counted number of instances is greater than a predetermined instance number threshold value (for example, the maximum value of the timeline instance number) and where (for example, step S807; True) a ratio of the time slices in which the number of instances does not satisfy a predetermined criterion is greater than a predetermined ratio threshold value (for example, the ratio of zero-instance time slices among the time slices); and a data extraction unit that determines, as data to be represented among minority tag ID-appended data, data (for example, the text 1602 of the text score list 160) in which a score satisfies a predetermined criterion (for example, the score 1604 is maximum), the score being obtained from an appearance rate (for example, the appearance rate 1103 of the word appearance rate list 110) of a word (for example, the used word 1004 in the minority tag ID-appended text list 100) used in the minority tag ID-appended data obtained by analyzing, for each peak timezone of minority tag IDs for identifying the extracted minority tags, the minority tag ID-appended data to which a minority tag identified by the minority tag ID has been appended, and from an appearance rate (for example, the appearance rate 1403 of the word appearance rate list 140) of a word (for example, the used word 1304 in the peak timezone text list 130) used in the minority tag ID-appended data obtained by analyzing, in the timeline for the minority tag IDs, the minority tag ID-appended data in the time slice in which the number of instances of the minority tag ID-appended data including the minority tag identified by the minority tag ID peaks (the respective peaks in a case where there are a plurality of peaks). Therefore, in the case of handling data to which tags have been appended, it is possible to extract, from among the minority tags, minority tags which have been appended to a data group in which the same topic is especially mentioned, and, among the extracted tags, it is possible to extract representative data from a data group to which the same tag has been appended.

Second Embodiment

In the second embodiment, instead of the tag ID-appended text list 121 being received as an input, an example in which the tag ID-appended text list 121 is acquired by appending a tag to a text list to which no tag has been appended will be described. The processing of the tag extraction unit 102 and the data extraction unit 103 is similar to that of the first embodiment. Hereinafter, configurations and operations different from those of the first embodiment will mainly be described.

Figure 18:
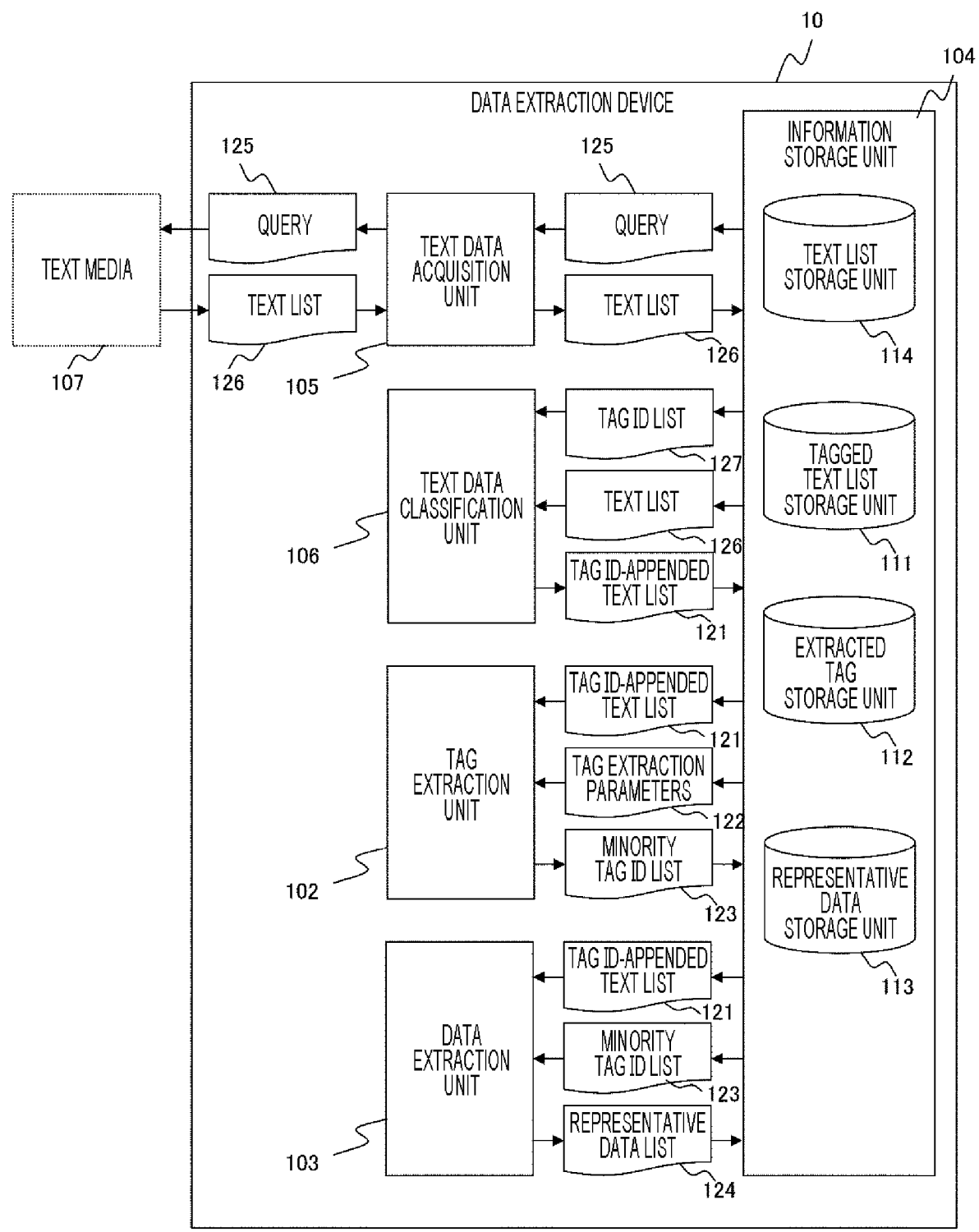
FIG. 18 is a diagram illustrating an example of a functional configuration of the data extraction device according to a second embodiment.

FIG. 18 is a diagram illustrating an example of a functional configuration of the data extraction device 10 according to the second embodiment. As illustrated in FIG. 18, the data extraction device 10 according to the second embodiment further includes a text data acquisition unit 105 and a text data classification unit 106 in addition to the configuration of the data extraction device 10 according to the first embodiment. In addition, the information storage unit 104 according to the present embodiment further includes a text list storage unit 114 in addition to the configuration of the information storage unit 104 according to the first embodiment. Furthermore, the data extraction device 10 is communicably connected to text media 107 that stores text data. The text media 107 is, for example, a web server that stores web information indicating a website such as a microblog.

Note that the information storage unit 104 may also store information or the like which is referred to and generated by the text data acquisition unit 105 and the text data classification unit 106 in addition to the text input unit 101, the tag extraction unit 102, and the data extraction unit 103. Examples thereof include a query 125 (FIG. 19), a text list 126 (FIG. 20), and a tag ID list 127 (FIG. 21), which will be described below.

When reading the query 125 from the information storage unit 104, the text data acquisition unit 105 transmits the query 125 to the text media 107, receives the text list 126 corresponding to the query 125, and stores the text list in the text list storage unit 114.

Figures 19, 20:
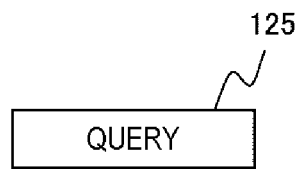
FIG. 19 is a diagram illustrating an example of a query according to the second embodiment.
FIG. 20 is a diagram illustrating an example of a text list according to the second embodiment.

FIG. 19 is a diagram illustrating an example of the query 125 according to the second embodiment. The query 125 illustrated in FIG. 19 is a conditional expression for acquiring a desired text list 126 from text data stored in the text media 107, and is described according to a format determined by the text media 107. The query 125 may be, for example, a search word or a logical expression of the search word used in the general text media 107, or may include attribute information of text data such as a search period in addition to the search word. Furthermore, in a case where the text media 107 prepares a text data providing means that does not depend on the query 125, the text list 126 may be acquired by the providing means.

FIG. 20 is a diagram illustrating an example of a text list 126 according to the second embodiment. The text records 2001 illustrated in FIG. 20 are used as records, and the text records 2001 include a text 2002 and time information 2003. Note that the text records 2001 may include information other than the text 2002 and the time information 2003. FIG. 20 illustrates, for example, that text 1 is a text created at the time "2020/07/23 17:58:36".

Based on the text list 126 read from the text list storage unit 114, the text data classification unit 106 creates the tag ID-appended text list 121 while referring to the tag ID list 127 read from the information storage unit 104, and stores the tag ID-appended text list in the tagged text list storage unit 111.

Figure 21:
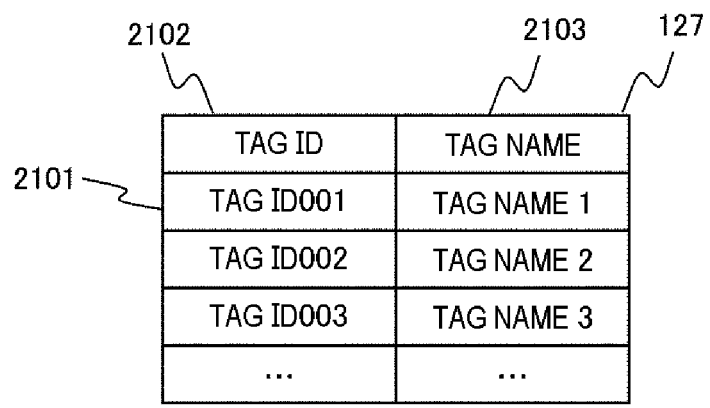
FIG. 21 is a diagram illustrating an example of a tag ID list according to the second embodiment.

FIG. 21 is a diagram illustrating an example of the tag ID list 127. The tag ID list 127 illustrated in FIG. 21 has tag ID records 2101 as records, and includes a tag ID 2102 and a tag name 2103. FIG. 21 illustrates, for example, that a tag name of a tag having a tag ID which is identified by "tag ID001" is "tag name 1".

The text list storage unit 114 stores the text list 126 received from the text data acquisition unit 105. Furthermore, the information storage unit 104 may also store information or the like which is referred to and generated by the text data acquisition unit 105 and the text data classification unit 106.

Figure 22:
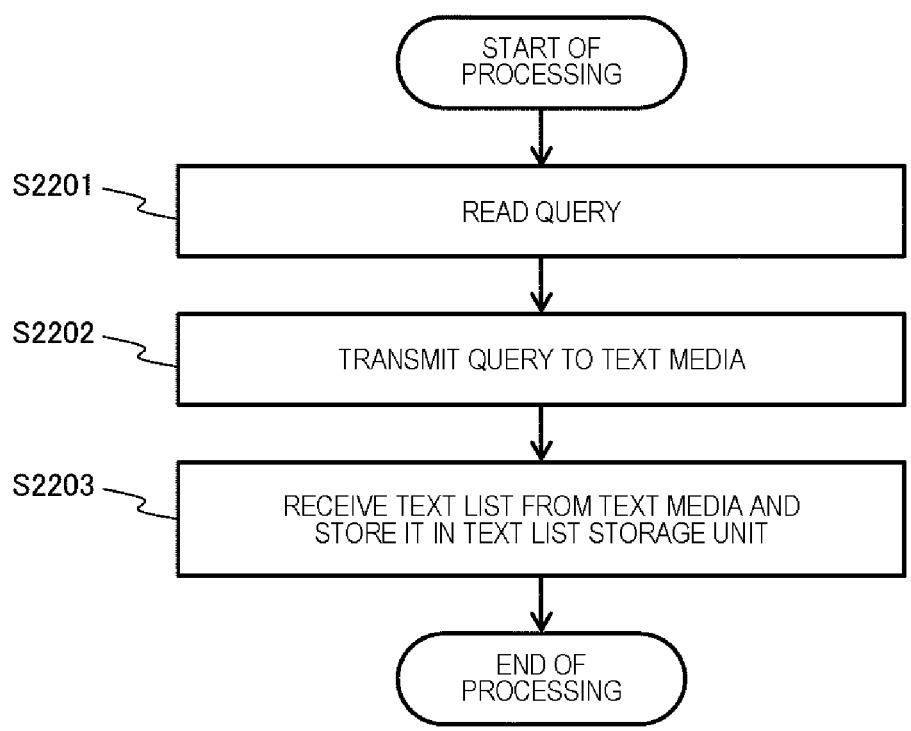
FIG. 22 is a flowchart illustrating an example of an operation of a text data acquisition unit of the data extraction device according to the second embodiment.

FIG. 22 is a flowchart to illustrate an example of the operation of the text data acquisition unit 105 according to the second embodiment. First, the text data acquisition unit 105 reads the query 125 from the information storage unit 104 (step S2201). Subsequently, the query 125 is transmitted to the text media 107 (step S2202). The text list 126 corresponding to the query 125 is then received from the text media 107 and stored in the text list storage unit 114 (step S2203).

Figures 23, 24:
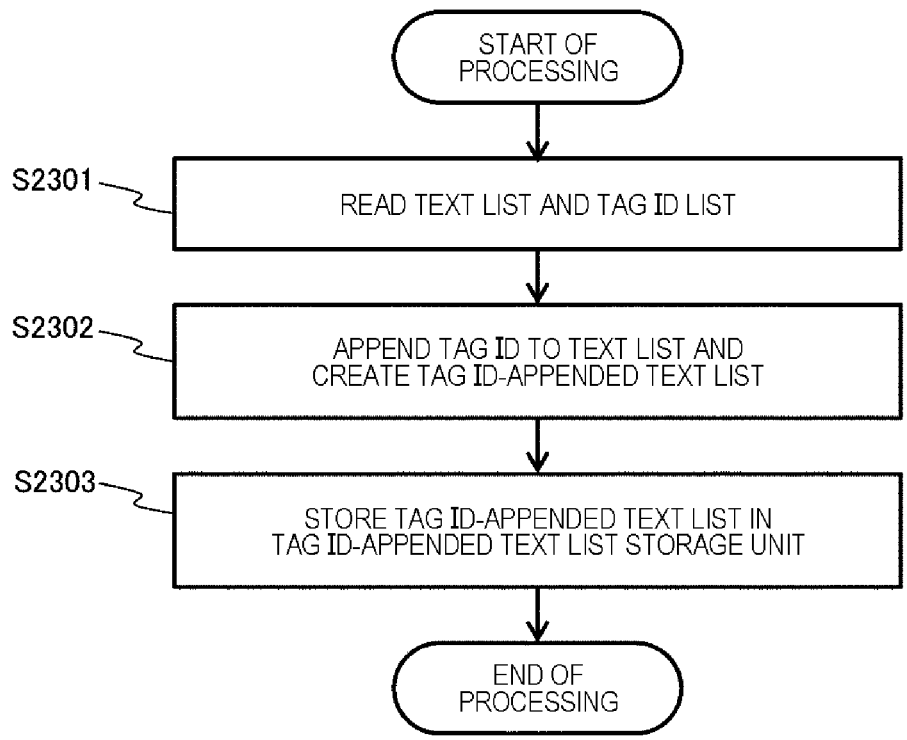
FIG. 23 is a flowchart illustrating an example of an operation of a text data classification unit of the data extraction device according to the second embodiment.
FIG. 24 is a diagram illustrating an example of tag extraction parameters according to a third embodiment.

FIG. 23 is a flowchart to illustrate an example of the operation of the text data classification unit 106 according to the second embodiment. First, the text data classification unit 106 reads the text list 126 from the text list storage unit 114 and reads the tag ID list 127 from the information storage unit 104 (step S2301). Subsequently, for all the text records 2001 of the text list 126, the tag ID records 2101 having a tag name 2103 which is related to the text 2002 of the text records 2001 are extracted from among the tag ID records 2101 in the tag ID list 127, and the tag IDs 2102 of the tag ID records 2101 are appended to the text records 2001, thereby obtaining the tag ID-appended text list 121 (step S2302). Here, whether the tag name 2103 is related to the text 2002 may be determined based on whether the tag name 2103 is included in the text 2002 as a character string, or may be determined using another method. Appending the tag IDs 2102 to the text records 2001 means that a column related to the tag IDs 2102 is added to the text list 126, and that the tag IDs 2102 appended to each of the text records 2001 are stored as the column values, and the resulting table is the tag ID-appended text list 121. Note that there may or may not be a plurality of tag ID records 2101 to be extracted for one text record 2001. Next, the tag ID-appended text list 121 thus created is stored in the tag ID-appended text list storage unit 111 (step S2303).

As described above, according to the present embodiment, the input unit includes: an acquisition unit (for example, the text data acquisition unit 105) that acquires, from a text media (for example, the text media 107) connected to the data extraction system, an unappended ID data group in which the time information is associated with unappended ID data (for example, the text list 126) to which the tag ID has not been appended; and a classification unit (for example, the text data classification unit 106) that creates the data group from the unappended ID data group on the basis of the unappended ID data group and a tag ID list (for example, the tag ID list 127) in which the tag ID and the tag name are associated with each other in advance. Therefore, tag ID-appended data (for example, the tag ID-appended text list 121) can be obtained even for texts to which a tag ID is not appended in advance.

Third Embodiment

In a third embodiment, an example is described in which the tag extraction unit 102 according to the first embodiment or the second embodiment extracts a minority tag ID list 123 that has a number of elements which is the number of records close to the value specified by the user. The configuration is the same as that of the first embodiment or the second embodiment. Processing other than that by the tag extraction unit 102 is the same as that according to the first embodiment or the second embodiment. Hereinafter, operation which is different from those of the first or second embodiment will mainly be described.

When reading the tag ID-appended text list 121 from the tagged text list storage unit 111 and the tag extraction parameters 122 from the information storage unit 104, the tag extraction unit 102 according to the third embodiment stores, in the extracted tag storage unit 112, a minority tag ID list 123 which has a number of elements close to the setting value 503 of the target extracted tag count 2411 described in the tag extraction parameter 122.

Note that the information storage unit 104 may also store information or the like which is referred to and generated by the text data acquisition unit 105 and the text data classification unit 106 in addition to the text input unit 101, the tag extraction unit 102, and the data extraction unit 103. For example, the tag extraction parameters are the tag extraction parameter 122 (FIG. 24) according to the third embodiment described below.

FIG. 24 is a diagram illustrating an example of the tag extraction parameters 122 according to the third embodiment. The tag extraction parameters 501 illustrated in FIG. 24 include an initial value of timeline instance number threshold value 2410, a time slice ratio threshold value 511, and a target extracted tag count 2411. In the third embodiment, while repeatedly attempting to extract the minority tag ID list 123 by changing the value of the timeline instance number threshold value 510 in the first or second embodiment, a search for the timeline instance number threshold value 510 is performed such that the number of elements of the minority tag ID list 123 is close to the setting value 503 of the target extracted tag count 2411. The initial value of timeline instance number threshold value 2410 indicates an initial timeline instance number threshold value 510 for initiating such a search. For example, a value such as "30" is set as the setting value 503 of the initial value of timeline instance number threshold value 2410. The target extracted tag count 2411 indicates the number of elements of the minority tag ID list 123 to be extracted. For example, a value such as "10" is set as the setting value 503 of the target extracted tag count 2411.

Figure 25A:
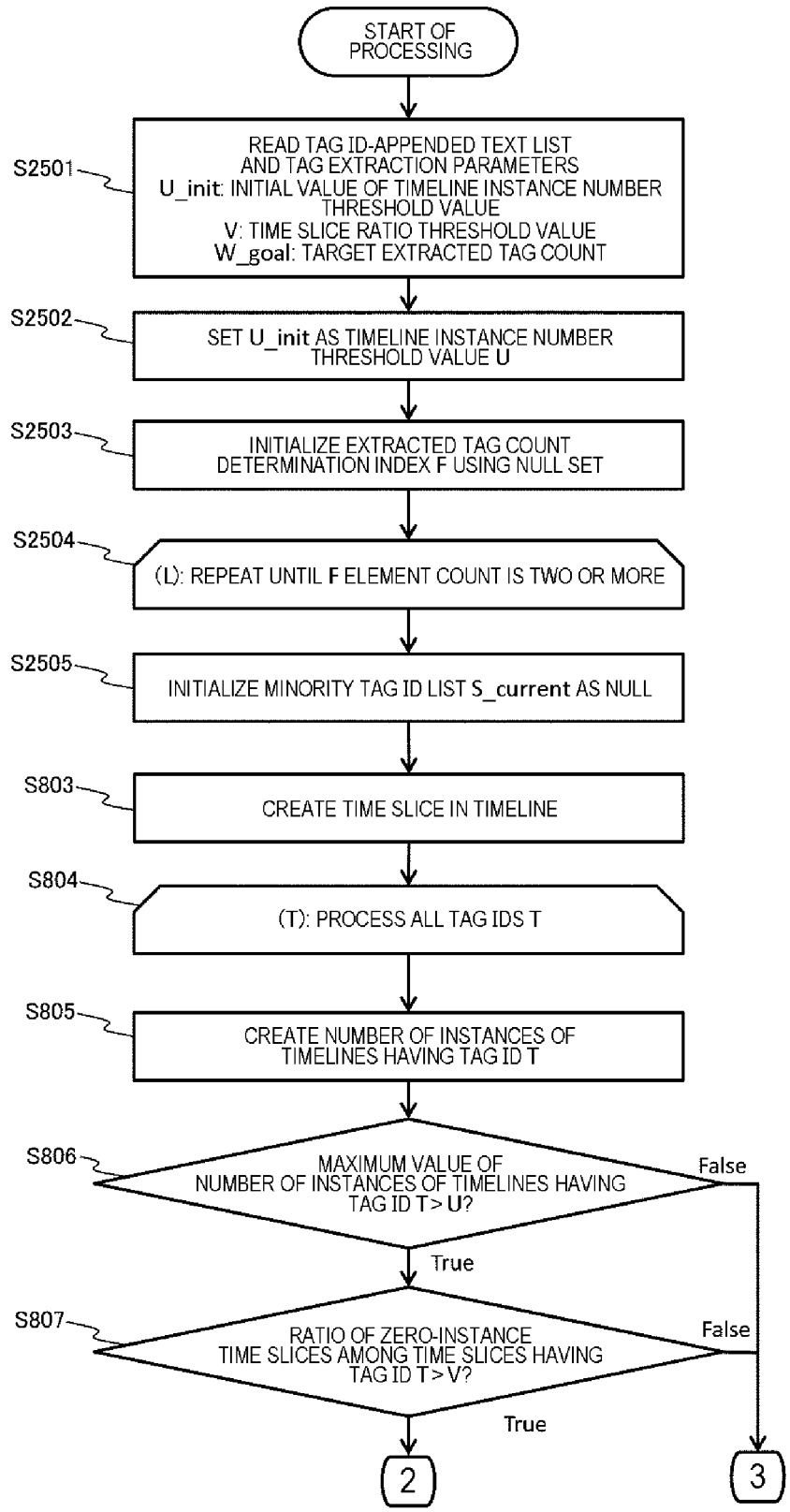
FIG. 25A is a flowchart illustrating an example of an operation of a tag extraction unit of the data extraction device according to the third embodiment.
Figure 25B:
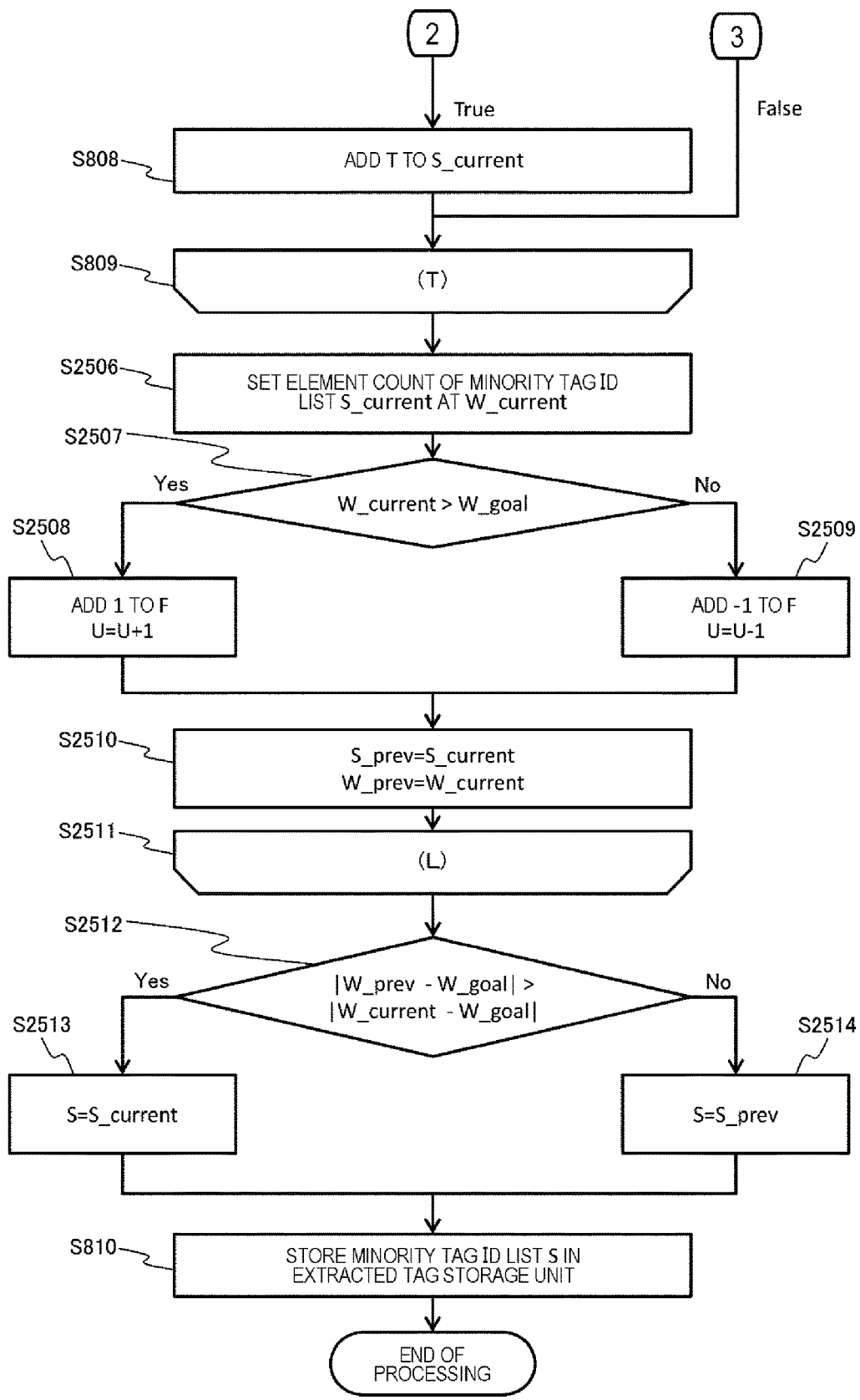
FIG. 25B is a flowchart illustrating an example of an operation of the tag extraction unit of the data extraction device according to the third embodiment.

FIGS. 25A, 25B are flowcharts to illustrate an example of the operation of the tag extraction unit 102 according to the third embodiment. First, the tag extraction unit 102 reads the tag ID-appended text list 121 and the tag extraction parameters 122, and sets the setting value 503 of the initial value of timeline instance number threshold value 2410 of the tag extraction parameters 122 at U_init, the setting value 503 of the time slice ratio threshold value 511 at V, and the setting value 503 of the target extracted tag count 2411 at W_goal, respectively (step S2501). Subsequently, a variable U representing the timeline instance number threshold value 510 is initialized at U_init (step S2502).

An extracted tag count determination index F to be used in determining a condition for exiting the processing loop from step S2504 to step S2511 starting immediately after this step is then initialized with a null set (step S2503). The processing of steps S2504 to S2511 is then repeated as the loop processing L until the number of elements of the extracted tag count determination index F becomes 2 or more (step S2504). A case where the number of elements is 2 or more is determined to be a case where the number of elements is 2 or more if, for example, there exist both a case where a few tags are obtained for the number of target extracted tags "10" and a case where a large number of tags is obtained for the number of target extracted tags "10".

In the loop processing L, first, a variable S_current representing the minority tag ID list 123 is initialized with a null list (step S2505). Subsequently, in the loop processing T of step S803 and steps S804 to S809 according to the first or second embodiment, processing similar to processing in which the variable S corresponding to the minority tag ID list 123 is replaced with the variable S_current is performed (steps S803 to S809). The values of S_current correspond to the values of the variable U used in the current loop processing and are the extracted minority tag ID list 123.

In the loop processing L, the number of elements of the variable S_current representing the minority tag ID list 123 is then set at W_current (step S2506). Subsequently, the values of W_current and W_goal are compared (step S2507). If W_current is greater (step S2507; Yes), the value 1 is added to the extracted tag count determination index F, the value of the variable U is increased by 1, and the processing advances to the next step S2510 (step S2508). Here, if the value 1 is already included in the extracted tag count determination index F, the value is not added to the extracted tag count determination index F. Furthermore, here, adding the value 1 to the extracted tag count determination index F means that the number of elements in the minority tag ID list 123 extracted in the loop processing L thus far has taken a value greater than the value of W_goal. Additionally, the reason why the value of the variable U is increased by 1 is that it is desirable to extract the minority tag ID list 123 having a smaller number of elements by attempting to extract the minority tag ID list 123 under a stricter condition in the next loop processing L.

On the other hand, if W_current is not greater (step S2507; No), a value −1 is added to the extracted tag count determination index F, the value of the variable U is reduced by 1, and the processing advances to the next step S2510 (step S2509). Here, if the value −1 is already included in the extracted tag count determination index F, no value is added to the extracted tag count determination index F. Furthermore, here, the addition of the value −1 to the extracted tag count determination index F means that the number of elements of the minority tag ID list 123 extracted in the loop processing L thus far has taken a value not greater than the value of W_goal. Further, the reason why the value of the variable U is reduced is that it is desirable to extract a minority tag ID list 123 having a greater number of elements by attempting to extract the minority tag ID list 123 under a looser condition in the next loop processing L.

In the loop processing L, subsequently, in order to hold the value of the current variable in the next loop processing L, the value of S_current is set as a variable S_prev, and the value of W_current is set as a variable W_prev (step S2510). When the processing of steps S2505 to S2510 is executed until the number of elements of the extracted tag count determination index F becomes 2 or more, the tag extraction unit 102 exits the loop processing L (step S2511). Note that, in the loop processing L, an upper limit for the number of loops may be set in order to prevent an infinite loop from occurring.

Subsequently, the absolute value of the difference between W_prev and W_goal is compared with the absolute value of the difference between W_current and W_goal (step S2512). If the absolute value of the difference between W_prev and W_goal is greater (step S2512; Yes), the value of S_current is set at the variable S representing the minority tag ID list 123 which is finally extracted, and the processing advances to step S810 (step S2513). If the absolute value of the difference between W_prev and W_goal is smaller (step S2512; No), a value of S_prev is set as a variable S representing the minority tag ID list 123 which is finally extracted, and the processing advances to step S810 (step S2514).

The processing in steps S2513 and S2514 corresponds to processing to select one of S_prev and S_current whose number of elements is closer to W_goal as the minority tag ID list 123 which is finally extracted. Subsequently, the value of the variable S representing the minority tag ID list 123 is stored in the extracted tag storage unit 112 (step S810).

As described above, according to the present embodiment, the tag extraction unit uses the number of extracted minority tags (for example, the number of elements in the minority tag ID list 123) and the target number of the number of extracted minority tags (for example, the target extracted tag count 2411) to repeat the processing to extract the minority tags by making the predetermined instance number threshold value greater than the current value in a case where the current number of minority tags is greater than the target number (for example, step S2507; Yes and step S2508) and the processing to extract the minority tags by making the predetermined instance number threshold value smaller than the current value in a case where the current number of minority tags is not greater than the target number (for example, step S2507; No and step S2509), thus extracting the minority tags in a number close to the target number with a difference equal to or smaller than a certain value (for example, steps S2512 to S2514). Thus, the number of minority tags desired by the user can be extracted while searching for the timeline instance number threshold value.

Fourth Embodiment

In a fourth embodiment, an example is described in which the tag extraction unit 102 according to the first embodiment, the second embodiment, or the third embodiment sorts the extracted minority tag ID list 123 in order of priority before storing same. Processing other than that of the configuration and the tag extraction unit 102 is the same as that in the first embodiment, the second embodiment, and the third embodiment. Hereinafter, operation which is different from those of the first, second, or third embodiment will mainly be described.

When reading the tag ID-appended text list 121 from the tagged text list storage unit 111 and the tag extraction parameters 122 from the information storage unit 104, the tag extraction unit 102 according to the fourth embodiment extracts the minority tag ID list 123 sorted in order of priority, and stores same in the extracted tag storage unit 112.

Note that the information storage unit 104 may also store information or the like which is referred to and generated by the text data acquisition unit 105 and the text data classification unit 106 in addition to the text input unit 101, the tag extraction unit 102, and the data extraction unit 103. Examples thereof include a tag similarity matrix 270 (FIG. 27) and a minority tag ID score list 280 (FIG. 28) to be described below.

Figure 26:
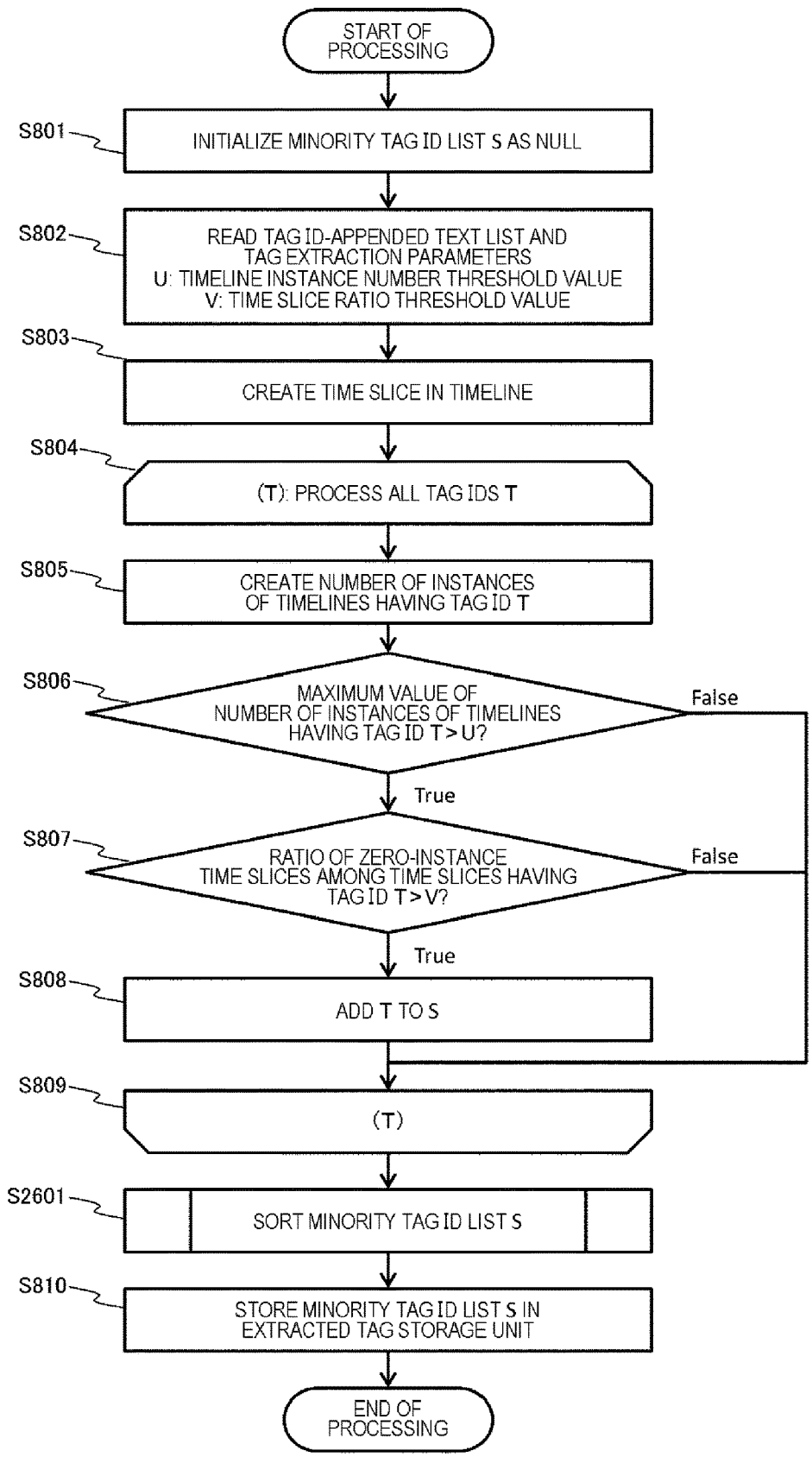
FIG. 26 is a flowchart illustrating an example of an operation of a tag extraction unit of the data extraction device according to a fourth embodiment.

FIG. 26 is a flowchart to illustrate an example of the operation of the tag extraction unit 102 according to the fourth embodiment. The processing up to step S809 is similar to that in FIG. 8. Subsequently, the tag extraction unit 102 sorts the variable S elements corresponding to the minority tag ID list 123 in order of priority (step S2601). An example of the operation of step S2601 will be described with reference to the flowchart of FIG. 29. Subsequently, processing similar to that in step S810 in FIG. 8 is performed.

FIG. 27 is a diagram illustrating an example of the tag similarity matrix 270 for scoring the variable S elements corresponding to the minority tag ID list 123 in step S2601. The tag similarity matrix 270 illustrated in FIG. 27 includes a horizontal axis 2701, a vertical axis 2702, and a cell 2703. The horizontal axis 2701 and the vertical axis 2702 include variable S elements that represent the minority tag ID list 123. In addition, the value of the cell 2703 located at the intersection of column C, which corresponds to a certain tag ID 2102 of the horizontal axis 2701, and row R, which corresponds to a certain tag ID 2102 of the vertical axis 2702, represents the similarity between the tag name 2103 corresponding to the tag ID 2102 of column C and the tag name 2103 corresponding to the tag ID 2102 of row R. Here, in the calculation of the similarity of the tag names 2103, cosine similarity, which is generally known, or thesaurus information hierarchically defining a concept, or the like, may be used. FIG. 27 indicates that, for example, the similarity between a tag identified by "tag ID001" and a representative tag, which is a tag identified by "tag ID033", is "0.36".

FIG. 28 is a diagram illustrating an example of a minority tag ID score list 280. The minority tag ID score list 280 illustrated in FIG. 28 records and has a minority tag ID score 2801, and includes a tag ID 2802 and a score 2803.

Figure 29:
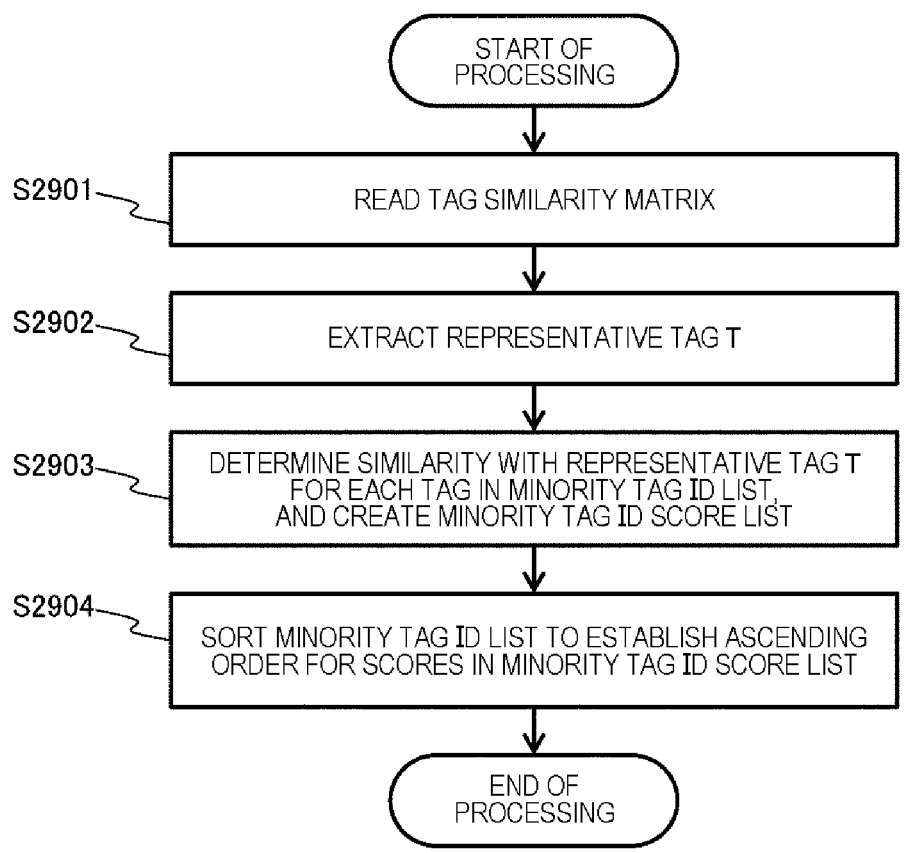
FIG. 29 is a flowchart illustrating an example of an operation of minority tag ID list sorting processing in a tag extraction unit of the data extraction device according to the fourth embodiment

FIG. 29 is a flowchart to illustrate an example of the operation of the processing to sort the minority tag ID list (step S2601) by the tag extraction unit 102 according to the fourth embodiment. First, the tag extraction unit 102 reads the tag similarity matrix 270 (step S2901). Subsequently, the tag extraction unit 102 extracts, as a representative tag T, the tag ID 2102 included in the largest number of pieces of the tag ID-appended text 301 in the tag ID-appended text list 121 (step S2902). Note that the representative tag T may also be extracted using another method. For example, in a case where there is a tag ID 2102 having the query 125 in the tag name 2103, the query 125 may be used as the representative tag T.

Subsequently, the tag extraction unit 102 extracts, for each minority tag ID 601 in the minority tag ID list 123, a value, on the tag similarity matrix 270, of a cell 2703 at an intersection of a column whose value on the horizontal axis 2701 is the representative tag T and a row whose value on the vertical axis 2702 is the minority tag ID 601, and takes this value as a score 2803 of the minority tag ID score 2801 corresponding to the minority tag ID 601 of the minority tag ID score list 280, thereby creating the minority tag ID score list 280 (step S2903). The variable S elements corresponding to the minority tag ID list 123 are then sorted in descending order of the scores 2803 of the minority tag ID score list 280 (step S2904).

As described above, according to the present embodiment, the tag extraction unit extracts, as a representative tag, the tag of the minority tag IDs included in the most tag ID-appended data from among the minority tag IDs for identifying the extracted minority tags, and sorts the extracted minority tags in descending order of similarity to the extracted representative tag (for example, in the order indicated by the minority tag ID score list 280). Therefore, the visibility of the extracted minority tag list can be enhanced.

REFERENCE SIGNS LIST

10 data extraction device
11 processor
12 main storage device
13 auxiliary storage device
14 input device
15 output device
16 communication device
101 text input unit
102 tag extraction unit
103 data extraction unit
104 information storage unit
105 text data acquisition unit
106 text data classification unit

The invention claimed is:

1. A data extraction system, comprising:
a processor which when executing a program configures the processor to:
receive an input of a data group in which tag ID-appended data and time information on a time the tag ID-appended data was created are associated with each other;
count the number of instances of the tag ID-appended data, to which a tag identified by a tag ID has been appended, occurring in each time slice for each tag ID included in the tag ID-appended data and for each time slice obtained by dividing a timeline including the time information by a predetermined duration, and that extracts the tags as a few exuberant and useful minority tags in a case where the counted number of instances is greater than a predetermined instance number threshold value and where a ratio of the time slices in which the number of instances does not satisfy a predetermined criterion is greater than a predetermined ratio threshold value; and
determine, as data to be represented among minority tag ID-appended data, data in which a score satisfies a predetermined criterion, the score being obtained from an appearance rate of a word used in the minority tag ID-appended data obtained by analyzing, for each peak timezone of minority tag IDs for identifying the extracted minority tags, the minority tag ID-appended data to which a minority tag identified by the minority tag ID has been appended, and from an appearance rate of a word used in the minority tag ID-appended data obtained by analyzing, in the timeline for the minority tag IDs, the minority tag ID-appended data in the time slice in which the number of instances of the minority tag ID-appended data including the minority tag identified by the minority tag ID peaks.

2. The data extraction system according to claim 1, wherein
the processor is further configured to:
acquire an unappended ID data group in which the time information and unappended ID data to which the tag ID has not been appended are associated, from a text medium connected to the data extraction system; and
create the data group from the unappended ID data group based on the unappended ID data group and a tag ID list in which tag IDs and tag names are associated with each other in advance.

3. The data extraction system according to claim 1, wherein the processor is further configured to: use the number of the extracted minority tags and a target number of the number of extracted minority tags, to repeat processing to extract the minority tags by making the predetermined instance number threshold value greater than a current value in a case where a current number of the minority tags is greater than the target number, and processing to extract the minority tags by making the predetermined instance number threshold value smaller than the current value in a case where the current number of minority tags is not greater than the target number, thus extracting the minority tags in a number close to the target number with a difference equal to or smaller than a certain value.

4. The data extraction system according to claim 1, wherein the processor is further configured to extract, as a representative tag, the tag of the minority tag IDs included in the most tag ID-appended data from among the minority tag IDs for identifying the extracted minority tags, and sorts the extracted minority tags in descending order of similarity to the extracted representative tag.

5. A data extraction method executed by a computer, the method comprising the steps of:
receiving an input of a data group in which tag ID-appended data and time information on a time the tag ID-appended data was created are associated with each other;
counting the number of instances of the tag ID-appended data, to which a tag identified by a tag ID has been appended, occurring in each time slice for each tag ID included in the tag ID-appended data and for each time slice obtained by dividing a timeline including the time information by a predetermined duration, and extracting the tags as a few exuberant and useful minority tags in a case where the counted number of instances is greater than a predetermined instance number threshold value and where a ratio of the time slices in which the number of instances does not satisfy a predetermined criterion is greater than a predetermined ratio threshold value; and
determining, as data to be represented among minority tag ID-appended data, data in which a score satisfies a predetermined criterion, the score being obtained from an appearance rate of a word used in the minority tag ID-appended data obtained by analyzing, for each peak timezone of minority tag IDs for identifying the extracted minority tags, the minority tag ID-appended data to which a minority tag identified by the minority tag ID has been appended, and from an appearance rate of a word used in the minority tag ID-appended data obtained by analyzing, in the timeline for the minority tag IDs, the minority tag ID-appended data in the time slice in which the number of instances of the minority tag ID-appended data including the minority tag identified by the minority tag ID peaks.

6. The data extraction method according to claim 5, further comprising the steps of:
acquiring an unappended ID data group in which the time information and unappended ID data to which the tag ID has not been appended are associated, from a text medium connected to a computer; and
creating the data group from the unappended ID data group based on the unappended ID data group and a tag ID list in which tag IDs and tag names are associated with each other in advance.

7. The data extraction method according to claim 5, further comprising the steps of:
using the number of the extracted minority tags and a target number of the number of the extracted minority tags, to repeat processing to extract the minority tags by making the predetermined instance number threshold value greater than a current value in a case where a current number of the minority tags is greater than the target number, and processing to extract the minority tags by making the predetermined instance number threshold value smaller than the current value in a case where the current number of minority tags is not greater than the target number, thus extracting the minority tags in a number close to the target number with a difference equal to or smaller than a certain value.

8. The data extraction method according to claim 5, further comprising the step of:
extracting, as a representative tag, the tag of the minority tag IDs included in the most tag ID-appended data from among the minority tag IDs for identifying the extracted minority tags, and sorts the extracted minority tags in descending order of similarity to the extracted representative tag.

* * * * *